(12) United States Patent
Charboneau et al.

(10) Patent No.: US 11,235,843 B2
(45) Date of Patent: Feb. 1, 2022

(54) SYSTEMS AND METHODS FOR LOGGING ISOLATOR PERFORMANCE DATA

(71) Applicant: CDG Coast Dynamics Group Ltd., Victoria (CA)

(72) Inventors: Daniel Bennett Charboneau, Victoria (CA); Michael James Leslie, Mill Bay (CA); Jarrett Owen Little, Victoria (CA); Robert Stanford Magyar, Victoria (CA); Timothy Rees, Victoria (CA); Mark Leighton Foster, Victoria (CA); Daryl Peter Peereboom, Brentwood Bay (CA); Ruilin Cao, Victoria (CA)

(73) Assignee: Allsalt Maritime Corporation, Victoria (CA)

( * ) Notice: Subject to any disclaimer, the term of this patent is extended or adjusted under 35 U.S.C. 154(b) by 130 days.

(21) Appl. No.: 16/818,810

(22) Filed: Mar. 13, 2020

(65) Prior Publication Data

US 2020/0290708 A1 Sep. 17, 2020

Related U.S. Application Data

(60) Provisional application No. 62/819,202, filed on Mar. 15, 2019.

(51) Int. Cl.
*B63B 29/04* (2006.01)

(52) U.S. Cl.
CPC ........ *B63B 29/04* (2013.01); *B63B 2029/043* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,602,429 | B2 * | 12/2013 | Nguyen | F16F 9/56 |
| | | | | 280/124.162 |
| 9,777,793 | B1 * | 10/2017 | Chen | F16M 11/121 |
| 10,422,405 | B2 * | 9/2019 | Donaldson | F16F 15/03 |
| 10,816,056 | B2 * | 10/2020 | Chang | F16F 15/04 |
| 2002/0050167 | A1 * | 5/2002 | Foote | G01P 15/08 |
| | | | | 73/493 |
| 2002/0175020 | A1 * | 11/2002 | Corrigan | G01V 1/16 |
| | | | | 181/111 |

* cited by examiner

*Primary Examiner* — Stephen P Avila
(74) *Attorney, Agent, or Firm* — Oyen Wiggs Green & Mutala LLP

(57) ABSTRACT

An isolator performance data logging system comprising a displacement unit for measuring a displacement of the isolator. the displacement unit comprises a displacement sensor housing fixable relative to a mitigated end of the isolator, a target fixable relative to an unmitigated end of the isolator. A displacement sensor is located within the displacement sensor housing for measuring a displacement of the target relative to the displacement sensor. A first accelerometer unit is fixable relative to the mitigated end of the isolator. A second accelerometer unit is fixable relative to the unmitigated end of the isolator.

20 Claims, 14 Drawing Sheets

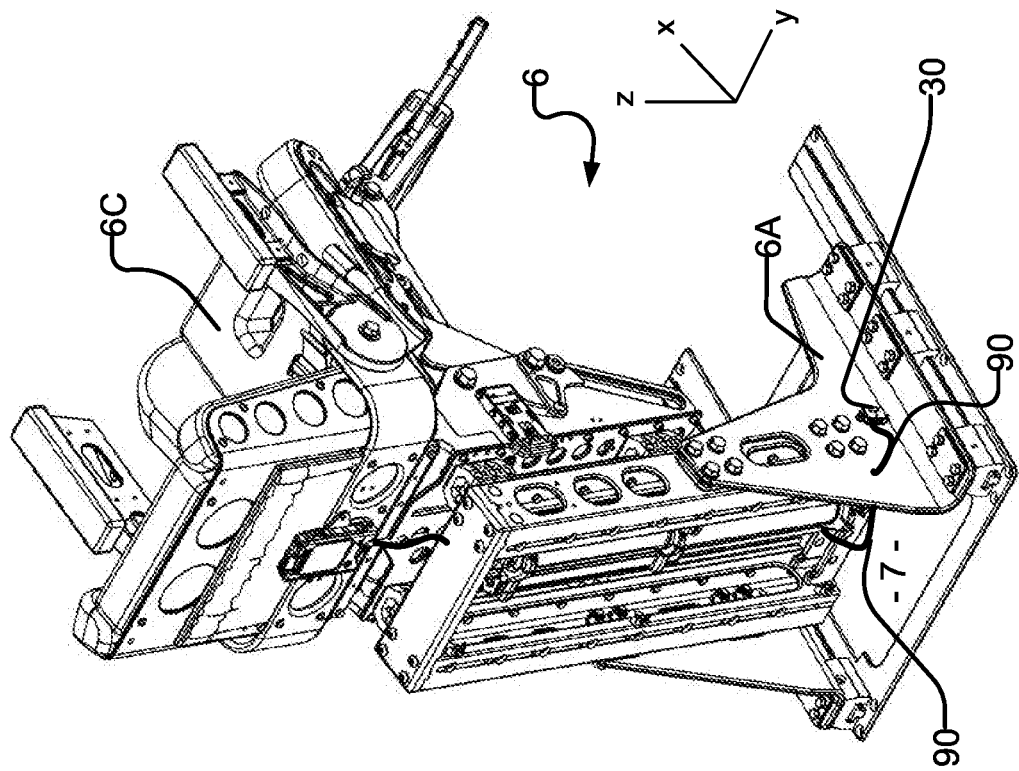
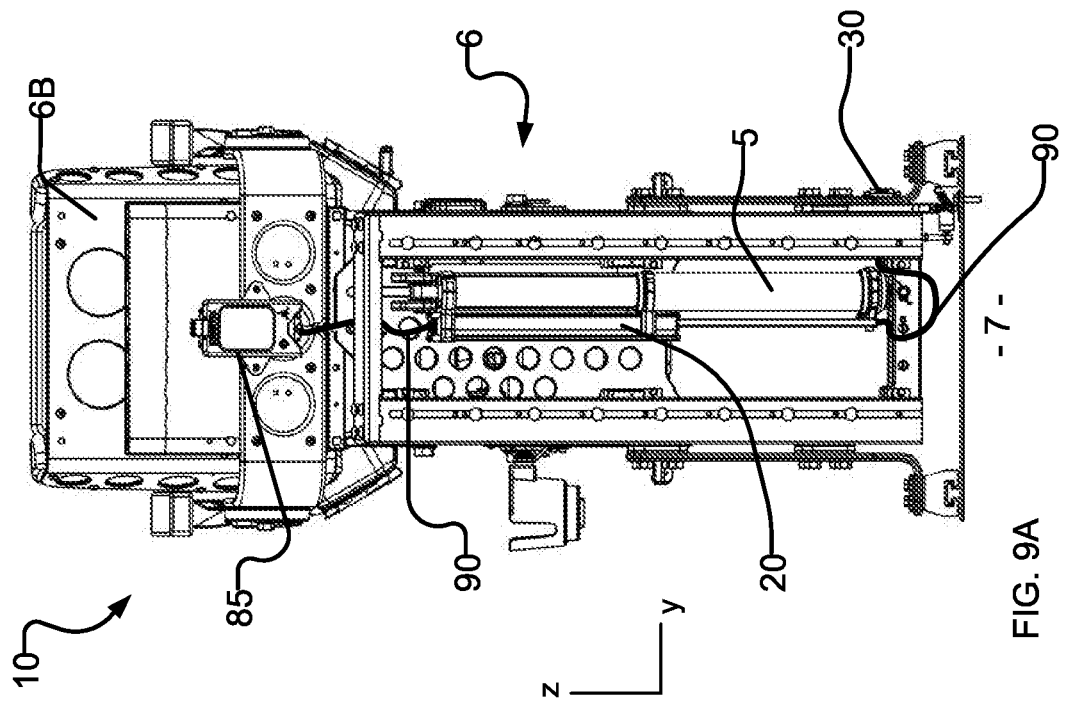
FIG. 9B
FIG. 9A

SYSTEMS AND METHODS FOR LOGGING ISOLATOR PERFORMANCE DATA

RELATED APPLICATIONS

This application claims the benefit of the priority of U.S. patent application No. 62/819,202 filed 15 Mar. 2019.

TECHNICAL FIELD

This invention relates generally to methods and systems for determining, displaying, logging and/or using performance data of isolators (e.g. shock absorbers such as coil-over shock absorbers or air-shock absorbers), and in particular to methods and systems for determining, displaying, logging and/or using performance data of suspension seats for military, commercial and recreational vehicles.

BACKGROUND

Suspension seats for military, commercial and recreational vehicles can reduce the forces experienced by operators or passengers as the vehicles move while travelling over rough surfaces. An example application of suspension seats is in fast boats travelling in rough water. A typical suspension seat comprises a first portion and a second portion movable relative to the first portion. An isolator (e.g. a shock absorber), such as a coil-over shock absorber or an air-shock absorber, mitigates (e.g. reduces or dampens) relative movement and acceleration between the first and second portions. The first portion is attached to a vehicle surface, and the second portion is attached to a seat or other support structure. Forces and accelerations applied to the first portion (e.g. the unmitigated end) as the vehicle bounces (e.g. as a boat moves through water) are mitigated by the isolator, such that the magnitude or severity of these forces and accelerations transferred to a person supported by the second portion (the mitigated end) is reduced.

Forces and accelerations experienced by operators or passengers of vehicles can be further reduced by fine-tuning various characteristics of the isolator of a suspension seat such as, for example, compression rate damping, rebound rate damping, air pressure, spring constant, preload, etc. Typically, such fine-tuning is done at the time of manufacture of the suspension seat or subsequently by trial and error. There remains a desire for methods and systems for displaying, determining, using and/or logging performance data of suspension seats in the field.

In some situations, the speed of the vehicle or the nature of the terrain may result in forces that are too great to be effectively mitigated by a suspension seat. Such forces could result in injury of an operator or passenger of the vehicle. There remains a desire for methods and systems for displaying, determining, using and/or logging performance data of suspension seats in real-time so that an operator can make real-time decisions to increase safety.

Suspension seats, particularly those on marine vehicles, experience harsh conditions. Suspension seats must be capable of withstanding large forces due to the interaction of the vehicle with rough terrain (e.g. waves). Suspension seats must be capable of withstanding various elements such as rain, ice, snow and seawater without failure or corrosion. There remains a desire for methods and systems for displaying, determining, using and/or logging performance data of suspension seats that can withstand the harsh conditions experienced by suspension seats (particularly those on marine vehicles).

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an isolator performance data logging system. The system comprises a first accelerometer unit fixable relative to a mitigated end of an isolator to measure mitigated accelerations, a second accelerometer unit fixable relative to an unmitigated end of the isolator to measure unmitigated accelerations, a displacement unit, the displacement unit comprising a displacement sensor fixable relative to the mitigated end of the isolator, and a target fixable relative to the unmitigated end of the isolator, wherein the displacement sensor measures a displacement of the target relative to the displacement sensor for determining a displacement of the isolator.

In some embodiments, the target comprises a plunger fixable relative to an unmitigated end of the isolator and at least partially slidably received within a displacement sensor housing of the displacement unit.

In some embodiments, the displacement sensor housing is fixable to a first endcap of the isolator and the target is fixable to a second endcap of the isolator.

In some embodiments, the system comprises a cable connected to deliver power to the displacement unit and transfer measurements from the displacement unit to a data storage device, wherein the cable is housed partially in the displacement sensor housing; deliver power to the first accelerometer unit and transfer measurements from the first accelerometer unit to the data storage device. In some embodiments, the cable is connected to deliver power to the second accelerometer unit and transfer measurements from the second accelerometer unit to the data storage device.

In some embodiments, the guide bushing comprises a passthrough and the cable passes from a first side of the guide bushing inside the displacement sensor housing through the passthrough to a second side of the guide bushing outside the displacement sensor housing.

In some embodiments, the cable is at least partially doubled over itself on the first side of the guide bushing and within the displacement sensor housing such that as the guide bushing slides within the displacement sensor housing in a direction toward the displacement sensor, an amount of the cable that is doubled over increases and as the guide bushing slides within the displacement sensor housing in a direction away from the displacement sensor, the amount of the cable that is doubled over decreases.

In some embodiments, the system comprises a removable casing, wherein the removable casing contains the data storage device and the removable casing is non-permanently removable from a storage bay of the system.

In some embodiments, the removable casing contains a battery for powering the isolator performance data logging system.

In some embodiments, the storage bay is connected to the displacement unit, first accelerometer unit and second accelerometer unit.

In some embodiments, the battery is chargeable by wireless charging. In some embodiments, the battery is chargeable by solar panels located on the removable casing.

In some embodiments, the target comprises a magnet and the displacement sensor comprises a magnetometer.

In some embodiments, the displacement unit comprises a first wireless communication device for transmitting measurements from the displacement unit and a first battery to power the displacement unit.

In some embodiments, the first accelerometer unit comprises a second wireless communication device for transmitting the measurements from the first accelerometer unit and a second battery to power the first accelerometer unit. In some embodiments, the second accelerometer unit comprises a third wireless communication device, for transmitting the measurements from the second accelerometer unit and a third battery to power the second accelerometer unit.

In some embodiments, the displacement unit, the first accelerometer unit and the second accelerometer unit are interchangeable.

In some embodiments, each of first, second and third wireless communication devices is configured to communicate wirelessly with a mobile device.

In some embodiments, the isolator is part of a suspension seat, the first accelerometer unit is attached to a mitigated portion of the seat and the second accelerometer is attached to an unmitigated portion of the seat. In some embodiments, the isolator is part of a suspension seat on a vehicle, the first accelerometer unit is attached to a mitigated portion of the seat and the second accelerometer is attached to a deck of the vehicle.

Another aspect of the invention provides a method of logging isolator performance data. The method comprises measuring, in real-time, a displacement of the isolator, measuring, in real time, mitigated accelerations of a mitigated end of the isolator, measuring, in real time, unmitigated accelerations of an unmitigated end of the isolator, and displaying, in real time, one or more indicators based at least in part on one or more of the displacement measurements, the mitigated accelerations measurements and the unmitigated accelerations measurements.

In some embodiments, measuring, in real-time, the displacement of the isolator comprises employing a magnetometer fixed to the mitigated end of the isolator to measure the magnetic field of a magnet fixed to the unmitigated end of the isolator.

In some embodiments, the method comprises obtaining one or more real time measurements from a mobile device and wherein the one or more indicators is based at least in part on the one or more real time measurements from the mobile device and the one or more of the displacement measurements, the mitigated accelerations measurements and the unmitigated accelerations measurements.

In some embodiments, the one or more real time measurements from the mobile device comprise measurements obtained from a global positioning sensor of the mobile device. In some embodiments, the one or more real time measurements from the mobile device comprise measurements obtained from a heart rate sensor of the mobile device. In some embodiments, the one or more real time measurements from the mobile device comprise measurements obtained from an accelerometer of the mobile device.

In some embodiments, the method comprises adjusting one or more settings of the isolator, in real time, based at least in part on one or more of the displacement measurements, the mitigated accelerations measurements and the unmitigated accelerations measurements. In some embodiments, the one or more settings of the isolator comprises a compression damping setting. In some embodiments, the one or more settings of the isolator comprises an air pressure setting. In some embodiments, the one or more settings of the isolator comprises a rebound damping setting. In some embodiments, the one or more settings of the isolator comprises a stroke length setting.

In some embodiments, the method comprises adjusting one or more settings of a seat attached to the isolator, in real time, based at least in part on one or more of the displacement measurements, the mitigated accelerations measurements and the unmitigated accelerations measurements. In some embodiments, the one or more settings of the seat comprises a height of the seat.

In some embodiments, the one or more indicators comprises a bottom-out risk indicator based at least in part on one or more of the displacement measurements, the mitigated accelerations measurements and the unmitigated accelerations measurements. In some embodiments, the one or more indicators comprises a bottom-out occurrence indicator based at least in part on the displacement measurements. In some embodiments, the one or more indicators comprises a vibration dose value based at least in part on one or more of the displacement measurements, the mitigated accelerations measurements and the unmitigated accelerations measurements. In some embodiments, the one or more indicators comprises an equivalent compressive stress metric based at least in part on one or more of the displacement measurements, the mitigated accelerations measurements and the unmitigated accelerations measurements.

In some embodiments, the method comprises attributing the one or more indicators to a specific passenger and tracking the one or more indicators attributed to the specific passenger over time.

In some embodiments, the method comprises receiving an indication from the specific passenger of their identity, the indication comprising pairing a mobile device of the specific passenger to a sensor. In some embodiments, the method comprises displaying, on the same display as the one or more indicators, a communication received from the mobile device of the specific passenger.

Another aspect of the invention provides an isolator performance data logging system. The system comprising a first sensor unit, a second sensor unit and a third sensor unit, wherein each of the first, second and third sensor units comprises a sensor unit housing containing a wireless communication device, a battery, a magnetometer and an accelerometer. the first sensor unit is fixed relative to a mitigated end of the isolator and the magnetometer of the first sensor unit measures displacement of a magnet fixed to an unmitigated end of the isolator. The second sensor unit is fixed relative to the mitigated end of the isolator and measures accelerations of the mitigated end of the isolator. The third sensor unit is fixed relative to the unmitigated end of the isolator and measures accelerations of the unmitigated end of the isolator.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 9A is rear view of an exemplary suspension seat and system for displaying, determining, using and/or logging performance data of the suspension seat according to one example embodiment of the invention. FIG. 9B is an isometric view of the suspension seat and system for displaying, determining, using and/or logging performance data of the suspension seat of FIG. 9A.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides an isolator performance data logging ("IPDL") system for displaying, determining, using and/or logging performance data of an isolator (e.g. a shock absorber, such as a coil-over shock absorber or an air-shock absorber). The system may comprise a displacement unit for measuring the displacement of the isolator (e.g. the amount of compression or extension of the isolator), a first accelerometer for determining forces and movements that are applied to the isolator at an unmitigated end of the isolator and a second accelerometer for measuring forces and movements that have been mitigated by the isolator at a mitigated end of the isolator.

The data obtained by an IPDL system may be employed for various purposes. For example, the data may be employed in real-time while operating a vehicle to ensure desired performance and/or safety standards are met. Alternatively or additionally, the data may be used subsequently for optimizing performance and/or safety, monitoring usage, identifying trends, diagnosing mechanical issues, logging use, user training, vessel maintenance, monitoring passenger health/vitals, vessel design and testing, etc.

Figure 1:
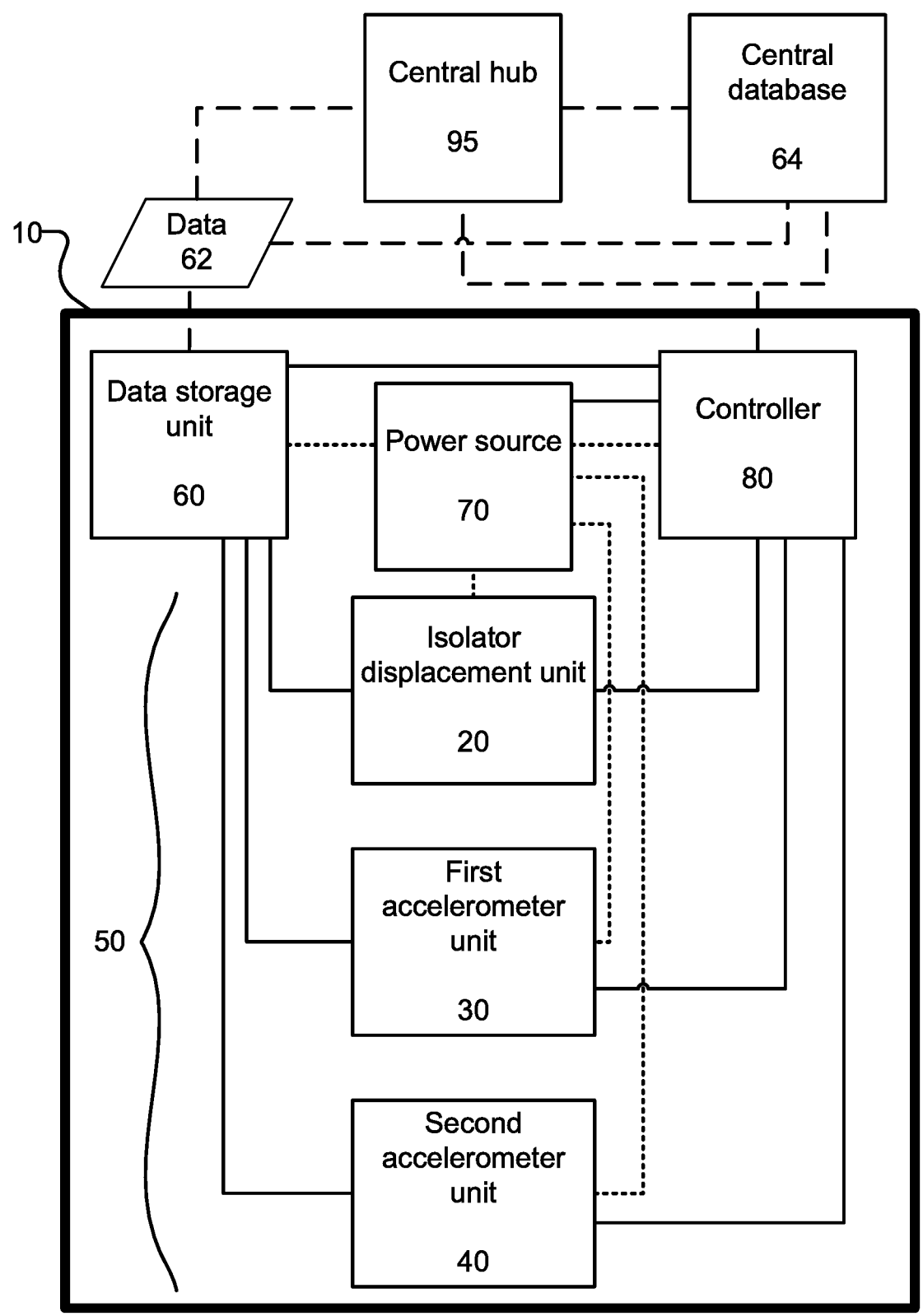
FIG. 1 is a block diagram of an exemplary system for displaying, determining, using and/or logging performance data of an isolator according to one example embodiment of the invention.

FIG. 1 is a schematic block diagram of an IPDL system 10 for displaying, determining, using and/or logging performance data of an isolator. IPDL system 10 comprises a displacement unit 20, a first accelerometer unit 30 and a second accelerometer unit 40 (collectively referred to as sensors 50). Each of sensors 50 may be connected to a data storage unit 60 for storing measurements obtained by sensors 50, a power source 70 for powering system 10 and a controller 80 for controlling sensors 50, data storage unit 60 and/or power source 70.

Displacement unit 20 may measure the displacement or travel of the isolator (e.g. the relative Z direction movement between an unmitigated end of the isolator and a mitigated end of the isolator) either directly or indirectly. First accelerometer unit 30 may measure accelerations and determine or be used to determine forces and movements at an unmitigated end of the isolator. Second accelerometer unit 40 may measure accelerations and determine or be used to determine forces and movements at a mitigated end of the isolator.

Figure 2:
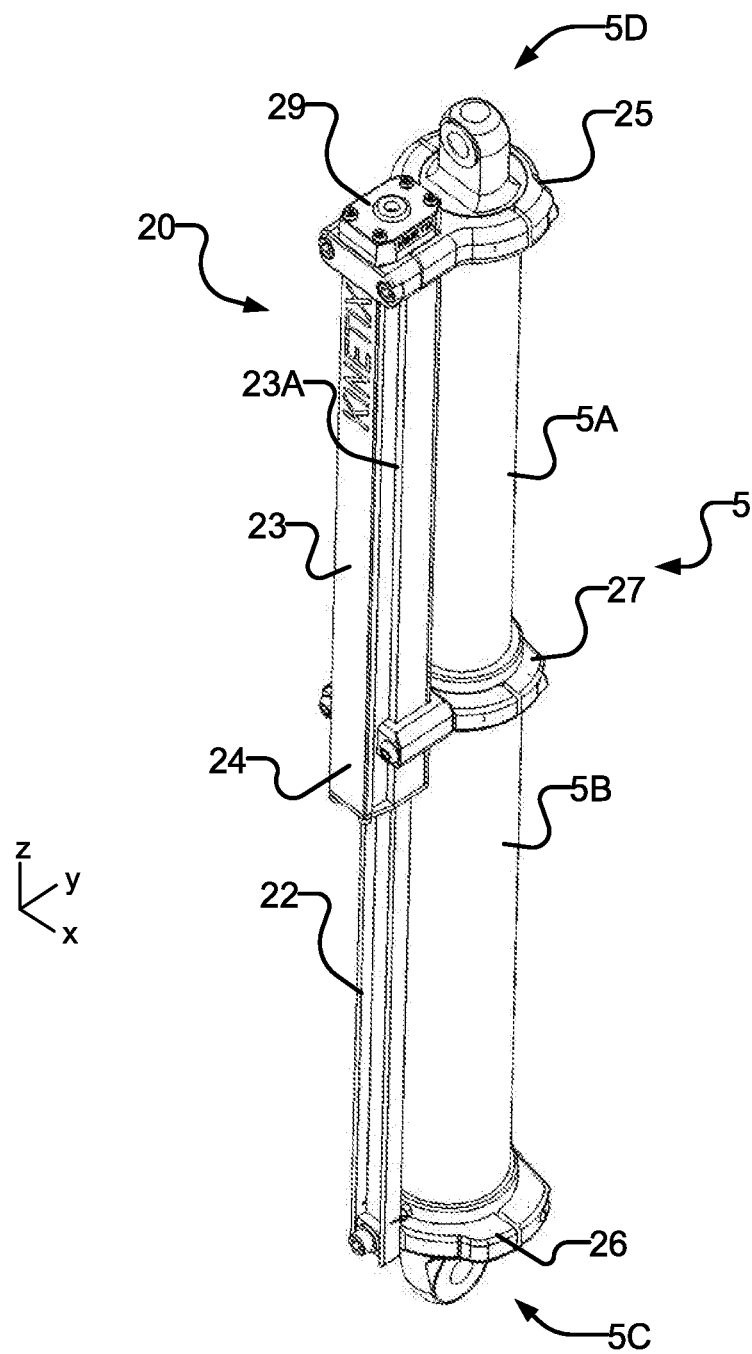
FIG. 2 is an isometric view of an exemplary displacement unit mounted to an exemplary isolator according to one example embodiment of the invention.

Displacement unit 20 may comprise any suitable apparatus for measuring the displacement (e.g. the relative Z direction movement between an unmitigated end of the isolator and a mitigated end of the isolator) of an isolator. For example, FIG. 2 is a perspective view of an exemplary displacement unit 20 mounted to an exemplary isolator 5.

Isolator 5 may comprise any suitable isolator (such as a coil-over shock absorber or an air-shock absorber) that mitigates relative movement in the Z direction between its ends (e.g. unmitigated end 5C and mitigated end 5D). In the illustrated embodiments, isolator 5 comprises a piston 5A slidably receivable in a tube 5B to allow relative Z direction movement between an unmitigated end 5C of isolator 5 and a mitigated end 5D of isolator 5 (also referred to "travel" or "displacement" of isolator 5).

In some embodiments, displacement of isolator 5 may be measured directly. In some embodiments, it may be undesirable, difficult and/or costly to directly measure the displacement of isolator 5. Displacement unit 20 as depicted in FIG. 2 may be employed to indirectly measure the displacement of isolator 5.

Displacement unit 20 comprises a plunger 22 that is slidably receivable in a housing 24 of displacement unit 20. In practice, displacement unit 20 is mounted to isolator 5 such that plunger 22 is fixed relative to a first end of isolator 5 (e.g. unmitigated end 5C) and housing 24 is fixed relative to a second end of isolator 5 (e.g. mitigated end 5D). Therefore, as isolator 5 compresses (e.g. a Z direction distance between unmitigated end 5C and mitigated end 5D is reduced), plunger 22 slides further into housing 24 and as isolator 5 extends (e.g. a Z direction distance between unmitigated end 5C and mitigated end 5D is increased), plunger 22 slides at least partially out of housing 24 (as can be seen by comparing FIGS. 4A and 4B). The displacement of isolator 5 may be indirectly measured, by measuring relative movement between plunger 22 and housing 24.

Displacement unit 20 may comprise a displacement sensor 28A to measure relative movement between plunger 22 and housing 24. Displacement sensor 28A is fixed relative to housing 24. Displacement sensor 28A may comprise any suitable displacement sensor such as, for example, a potentiometer displacement sensor, an inductive displacement sensor, a capacitive displacement sensor, an eddy current displacement sensor, a piezoelectric displacement sensor, an ultrasonic displacement sensor, a magnetoresistive displacement sensor, an optical encoder displacement sensor, an optical displacement sensor, a contact displacement sensor, a contactless displacement sensor, etc. In a particular, non-limiting example embodiment, displacement sensor 28A comprises a laser proximity sensor such as an infrared laser proximity sensor. Displacement sensor 28A may be located in, proximate to or attached to an endcap 29 of housing 24.

Displacement sensor 28A may measure displacement of a target 28B that is fixed relative to plunger 22. Since plunger 22 is fixed relative to unmitigated end 5C of isolator 5 and housing 24 is fixed relative to mitigated end 5D of isolator 5, the displacement of target 28B relative to displacement sensor 28A is substantially equal to the displacement of isolator 5.

Figure 5B:
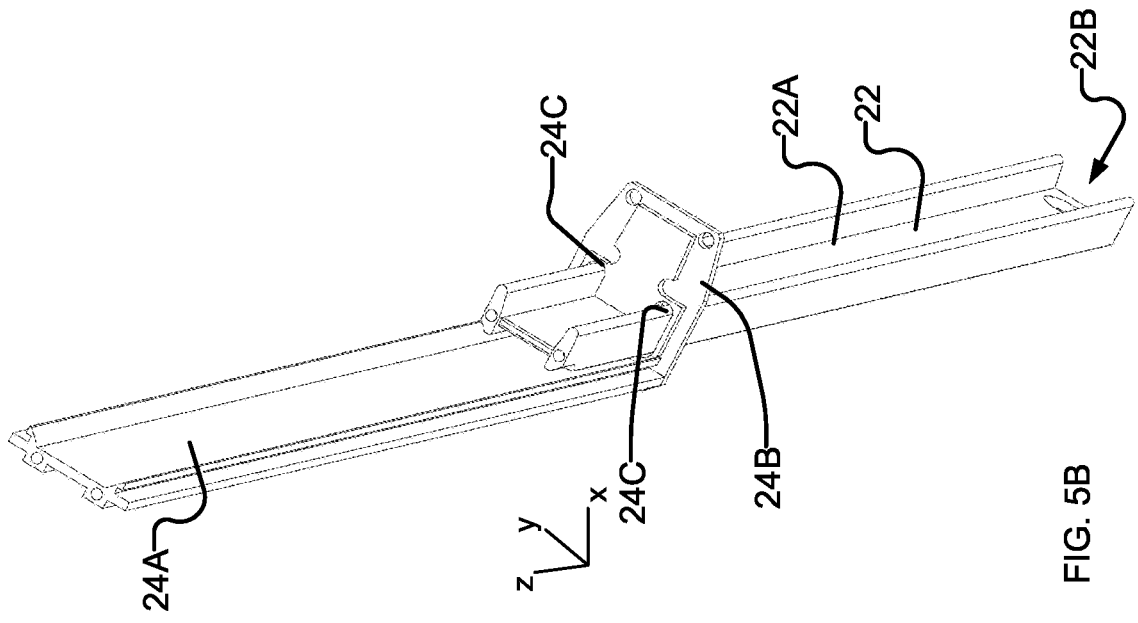
FIGS. 5A and 5B are isometric views of various exemplary components of the displacement unit of FIG. 2.
Figure 5A:
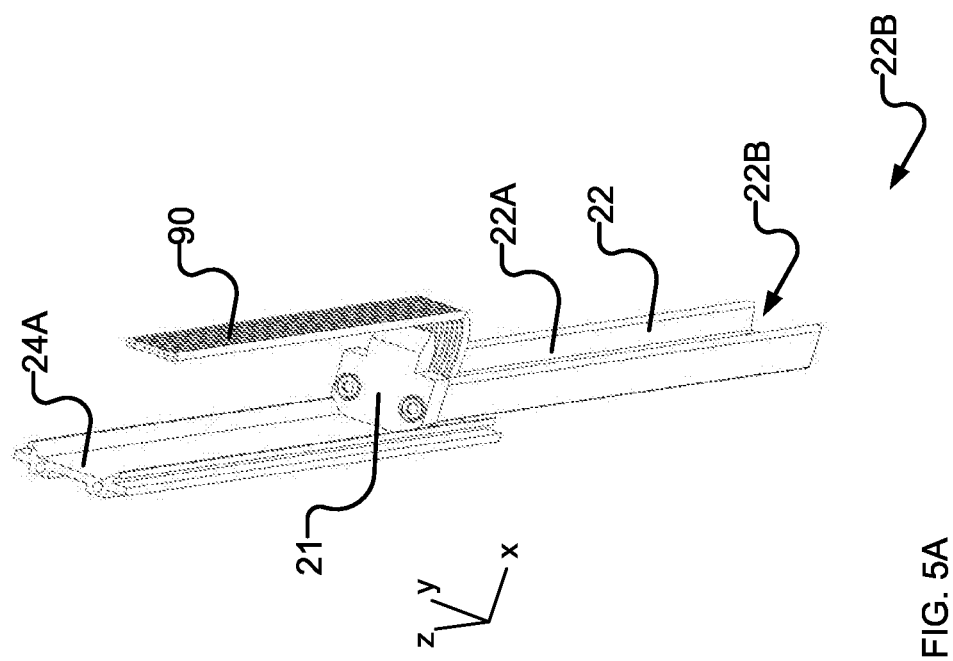

To facilitate sliding of plunger 22 relative to housing 24, various parts of plunger 22 may be shaped and/or sized to be complementary to one or more portions of housing 24. For example, as shown in FIG. 5A, plunger 22 may comprise a guide bushing 21 that is complementary in shape to a track 24A of housing 24. As plunger 22 slides relative to housing 24, a surface of guide bushing 21 may slide on track 24A to reduce unwanted relative transverse movement (e.g. movement in the X and/or Y directions) between housing 24 and plunger 22. Guide bushing 21 and track 24A may be fabricated from materials chosen to reduce friction therebetween, thereby facilitating relative movement between housing 24 and plunger 22 in the Z direction.

In some embodiments, a rail portion 22A of plunger 22 has a cross-sectional shape (in the XY plane) that is complementary to a guide 24B of housing 24. For example, as shown in FIG. 5B, rail portion 22A of plunger 22 has an H-shaped cross-section that is complementary to a guide aperture 24C defined by guide 24B of housing 24. As rail portion 22A passes through guide aperture 24C of guide 24B, longitudinal movement (e.g. Z direction movement) of plunger 22 is not substantially effected. In contrast, as rail portion 22A passes through guide aperture 24C of guide 24B, transverse movement (e.g. X and/or Y direction movement) of rail portion 22A relative to guide 24B is substantially prevented or reduced by an interaction of rail portion 22A with guide aperture 24C. In this way unwanted relative transverse movement (e.g. X and/or Y direction movement) between plunger 22 and housing 24 as plunger 22 slides in the Z direction relative to housing 24 is substantially reduced or prevented.

In some embodiments, one or more sealing features such as a seal (e.g. a rubber or elastomer seal), a wiper or a brush may be provided at guide aperture 24C to prevent ingress of fluids or debris through guide aperture 24C. One or more vents may be provided to allow for equalization of pressure within housing 24. In some embodiments, gravity may reduce the ingress of such fluid or debris into housing 24 through guide aperture 24C. Furthermore, the materials of plunger 22, housing 24 and their respective components may be chosen so as not to be susceptible to damage by fluid or debris (e.g. salt water) that ingresses through guide aperture 24C. Since displacement sensor 28A may be located at a substantially spaced apart location from guide aperture 24C (e.g. at or near endcap 29), a possibility of contact of displacement sensor 28A with fluid or debris may be reduced. Moreover, guide bushing 21 may provide an additional barrier to prevent undesirable fluid or debris from reaching displacement sensor 28A or target 28B.

In some embodiments, guide bushing 21 may serve as target 28B. For example, in some embodiments, guide bushing 21 is made of a sufficiently reflective material to serve as target 28B (e.g. sufficiently reflective to optical radiation from a laser of sensor 28A). In other embodiments, at least a portion of guide bushing 21 is coated in or attached to a sufficiently reflective material to serve as target 28B.

Housing 24 and plunger 22 may be mounted to isolator 5 in any suitable manner. In some embodiments, housing 24 and/or plunger 22 are directly mounted to isolator 5, such as is depicted in FIG. 2. In other embodiments, housing 24 and/or plunger 22 may be mounted to another structure that is fixed relative to a portion of isolator 5. For example, in some applications, isolator 5 is part of a suspension seat comprising a first portion and a second portion movable relative to the first portion. In such an application, housing 24 may be mounted to the first portion while plunger 22 is mounted to the second portion. Alternatively, one of housing 24 and plunger 22 may be mounted directly to isolator 5 while the other of housing 24 and plunger 22 is mounted to the first portion or second portion of the suspension seat.

Figure 3B:
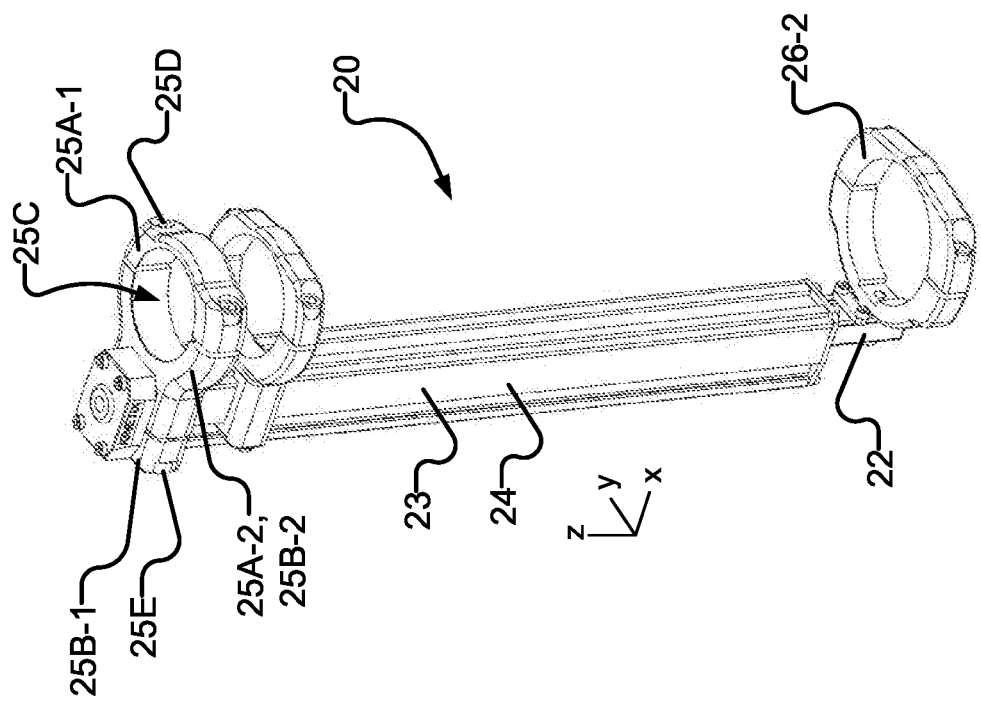
FIGS. 3A and 3B are isometric views of the displacement unit of FIG. 2.
Figure 3A:
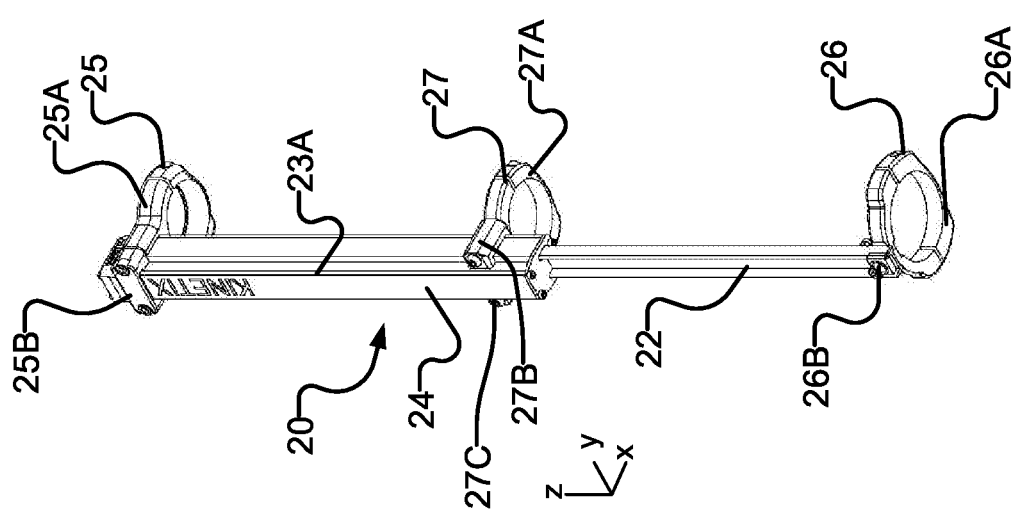

In the FIG. 2 embodiment, housing 24 is mounted to mitigated end 5D of isolator 5 by a first clamp 25. As best seen in FIGS. 3A and 3B, first clamp 25 comprises a primary clamp 25A for attaching isolator 5 to first clamp 25 and a secondary clamp 25B for attaching housing 24 to first clamp 25. Primary and secondary clamps 25A, 25B of first clamp 25 may function in a substantially common manner.

First and second portions 25A-1, 25A-2 of primary clamp 25A define an aperture 25C that is complementary in shape to a surface of isolator 5. In some embodiments, aperture 25C is round (e.g. circular) to accommodate isolators that have round (e.g. circular) cross-sections. As fasteners 25D of primary clamp 25A are tightened, first and second portions 25A-1, 25A-2 are pulled together and aperture 25C of primary clamp 25A thereby tightens around a surface of isolator 5 to attach first clamp 25 to isolator 5. In some embodiments, first clamp 25 may be attached to an end cap of isolator 5 so as not to damage isolator 5 (e.g. not to damage a surface of piston 5A).

First and second portions 25B-1, 25B-2 of secondary clamp 25B define an aperture that is complementary in shape to a surface 23 of housing 24. As fasteners 25E of secondary clamp 25B are tightened, first and second portions 25B-1, 25B-2 are pulled together and the aperture of secondary clamp 25B thereby tightens around surface 23 of housing 24 to attach first clamp 25 to housing 24. To accommodate for different size isolators, secondary clamp 25B may be attached to various locations along the Z direction length of housing 24.

In the FIG. 2 embodiment, plunger 22 is mounted to unmitigated end 5C of isolator 5 by a second clamp 26. Second clamp 26 comprises a primary clamp 26A for attaching isolator 5 to second clamp 26. Primary clamp 26A may be substantially similar to primary clamp 25A. Like primary clamp 25A, primary clamp 26A may be attached to an end cap of isolator 5 so as not to damage isolator 5. Second clamp 26 differs from first clamp 25 in that instead of a secondary clamp, second clamp 26 is directly mounted to plunger 22 by one or more fasteners 26B. This is not mandatory. Instead, a clamp like secondary clamp 25B could be employed to attach second clamp 26 to plunger 22.

In some embodiments, housing 24 and/or plunger 22 is attached to isolator 5 by an additional clamp. In the FIG. 2 embodiment, third clamp 27 is provided to reduce relative movement in the X and Y directions between housing 24 and isolator 5 while also allowing housing 24 to move in the Z direction relative to tube 5B of isolator 5.

Third clamp 27 comprises a primary clamp 27A substantially similar to primary clamp 25A. Third clamp 27 comprises a guide clamp 27B. Guide clamp 27B defines an opening that is complementary in shape to a surface 23 of housing 24 but is sufficiently loose to allow housing 24 to move in the Z direction relative to guide clamp 27B. In some embodiments, a fit of guide clamp 27B around surface 23 may be adjusted by adjusting fasteners 27C. In some embodiments, the material of guide clamp 27B is chosen or guide clamp 27B is coated to reduce friction between guide clamp 27B and surface 23 of housing 24 and facilitate relative Z direction movement between housing 24 and guide clamp 27B. In some embodiments, surface 23 comprises one or more guide features 23A such as ridges, tracks, rails or the like for guide clamp 27B to engage. Guide features 23A may facilitate relative Z direction movement between housing 24 and guide clamp 27B. Guide features 23A may restrict or reduce relative X and Y direction movement between housing 24 and guide clamp 27B.

In some embodiments, one or more of first, second and third clamps 25, 26, 27 are replaced with adhesive, direct mounting fasteners, hose clamps, welding or other suitable attachment mechanisms. In some embodiments, a gasket (e.g. rubber, elastomer or the like) is placed between one or more of first, second and third clamps 25, 26, 27 and isolator 5 to protect isolator 5, reduce vibration and/or reduce slippage between clamps 25, 26, 27 and isolator 5. In some embodiments, displacement unit 20 is integral with isolator 5. In some embodiments, isolator 5 and displacement unit 20 share a common housing. In some embodiments, a displacement sensor is integrated directly into isolator 5.

First accelerometer unit 30 may comprise any suitable three axis accelerometer sensor (or a combination of one and/or two axis accelerometers), such as, for example, a DC response accelerometer, an AC response accelerometer, a piezoresistive accelerometer, a piezoelectric accelerometer, a capacitive MEMS accelerometer, etc.

First accelerometer unit 30 may be attached to, for example, unmitigated end 5C of isolator 5 or another portion of a vehicle that is attached to unmitigated end 5C of isolator 5. In the case of a suspension seat, first accelerometer unit 30 could be mounted to the deck of a vehicle, or a portion of a pedestal or support of the seat. In some embodiments, first accelerometer unit 30 is carried by or attached to plunger 22 of displacement unit 20. In some embodiments, first accelerometer unit 30 has its own housing and/or mounting bracket such that it can be mounted (permanently or non-permanently) as desired.

Figure 6:
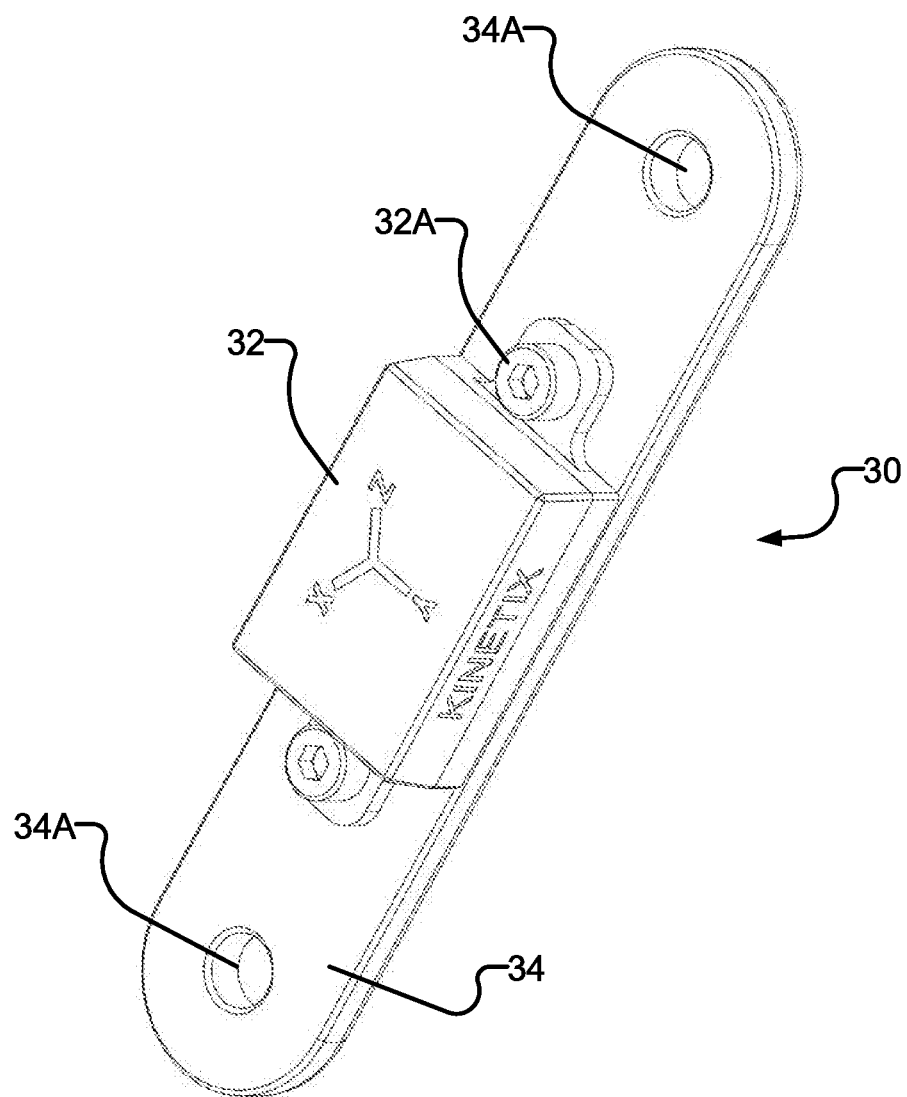
FIG. 6 is an isometric view of an exemplary first accelerometer unit according to one example embodiment of the invention.

FIG. 6 depicts an exemplary first accelerometer unit 30 according to an example embodiment of the invention. First accelerometer unit 30 comprises a housing 32 for protecting the accelerometer sensor from the elements. Housing 32 is mounted to a bracket 34 by fasteners 32A. Bracket 34 comprises one or more mounting features 34A for attaching first accelerometer unit 30 as desired. In some embodiments, mounting features 34A comprise apertures for receiving suitable fasteners. In other embodiments, mounting features 34A may comprise adhesive or the like. In some embodiments, bracket 34 may be welded in place.

In some embodiments, housing 32 may be filled with a potting material (such as, for example, silicone) to improve water-resistance, durability and shock-resistance of accelerometer unit 30.

Second accelerometer unit 40 may comprise any suitable three axis accelerometer sensor (or a combination of one and/or two axis accelerometers), such as, for example, a DC response accelerometer, an AC response accelerometer, a piezoresistive accelerometer, a piezoelectric accelerometer, a capacitive MEMS accelerometer, etc.

Second accelerometer unit 40 may be attached to, for example, mitigated end 5D of isolator 5 or another mitigated portion of a vehicle that is attached to mitigated end 5D of isolator 5. In the case of a suspension seat, second accelerometer unit 40 could be mounted to the seat itself. In some embodiments, second accelerometer unit 40 is carried by or attached to housing 24 of displacement unit 20. In some embodiments, second accelerometer unit 40 has its own housing and/or mounting bracket such that it can be mounted (permanently or non-permanently) as desired. In some embodiments, second accelerometer unit 40 is substantially similar to first accelerometer unit 30.

In some embodiments, one or both of first and second accelerometer sensors have a sampling rate in a range between 256 Hz to 1000 Hz. In some embodiments, one or both of first and second accelerometer sensors have a resolution in the range of 0.1 g to 0.0001 g (where g=9.81 m/s$^2$). In particular embodiments, one or both of first and second accelerometer sensors have a resolution of about 0.001 g. In some embodiments, one or both of first and second accelerometer sensors provides a digital output that is provided to controller 80. In some embodiments, one or both of first and second accelerometer sensors provides an analog output and controller 80 or another suitable piece of hardware converts the analog output to a digital signal for controller 80.

In some embodiments, second accelerometer unit 40 is attached to or housed by a central unit containing one or more of data storage 60, power source 70 and controller 80. In some embodiments, one or more of data storage 60 and power source 70 may be non-permanently removable for the purpose of, for example, charging power source 70 and or transferring data to/from data storage 60. In some applications, it may be desirable for data storage 60 to be non-permanently removable from IPDL system 10 to facilitate data transfer therefrom without relying on wireless technologies which can be unreliable or undesirable for security reasons. In some applications, it may be desirable for power source 70 to be self-contained (e.g. power source 70 may be a battery or supercapacitor or the like). If power source 70 is self-contained, IPDL system 10 may not need to rely on power from the vehicle which may simplify installation and facilitate transferability of IPDL system 10. In some embodiments, it is desirable for power source 70 to be a replaceable battery (or supercapacitor or the like) as recharging a permanent battery installed in IPDL system 10 may be slow and/or undesirable.

Data storage unit 60 may comprise a volatile or non-volatile data store. Controller 80 may periodically or continuously store values of output signals from one or more of sensors 50 or data based at least in part on output signals from one or more of sensors 50 in the data store. Data store 60 may comprise, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing output signals from sensors 50.

Power source 70 may comprise a battery, a supercapacitor, a solar panel, a wireless power receiver, a connection to a power source of vehicle, etc. or some combination thereof. In some embodiments, power source 70 is charged by solar panels, wireless charging, conversion of kinetic energy to electrical energy (e.g. conversion of kinetic energy from the movement, displacement or travel of isolator 5 or from the damping or mitigating of isolator 5), wired charging, etc.

Controller 80 may comprise, for example, a programmable processor. Controller 80 may have a sampling rate of 500 Hz, 667 Hz, 1000 Hz or more. Controller 80 may, for example, determine which signals and/or measurements of sensors 50 should be stored in data storage unit 60. Controller 80 may condition, calibrate or convert signals from sensors 50 into suitable formats and values for subsequent or real-time use. Controller 80 may comprise a clock for keeping track of the time at which measurements were taken by sensors 50 or at which signals received from sensor 50. In some embodiments, sensors 50 themselves include clocks for keeping track of the times at which measurements were taken and such data is sent to controller 80. Controller 80 may be connected to one or more lights (e.g. LEDs) or sound-emitters to warn a user when battery capacity is below a threshold, data storage unit 80 is reaching capacity and/or when system 10 experiences an error. Controller 80 may monitor and optimize power output from power source 70 to sensors 50 and controller 80. Controller 80 may be configured to control a power output of power source 70 and/or power usage of system 10 depending on, for example, remaining battery capacity, available power, whether or not movement or acceleration of isolator 5 is detected, etc. For example, controller 80 may cause system 10 to sleep if sensor 50 do not detect substantial change during a given period of time.

Figure 7B:
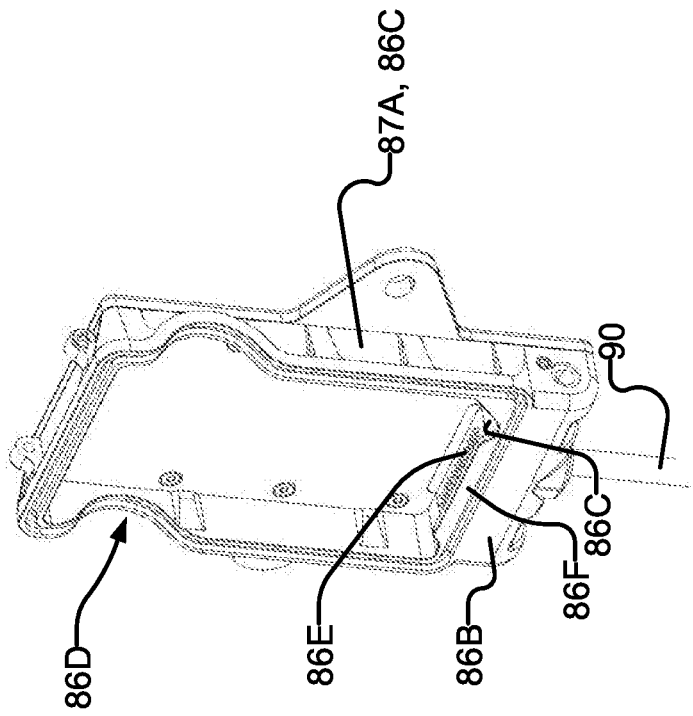
FIG. 7B is an isometric view of a portion of the central unit of FIG. 7A.
Figure 7A:
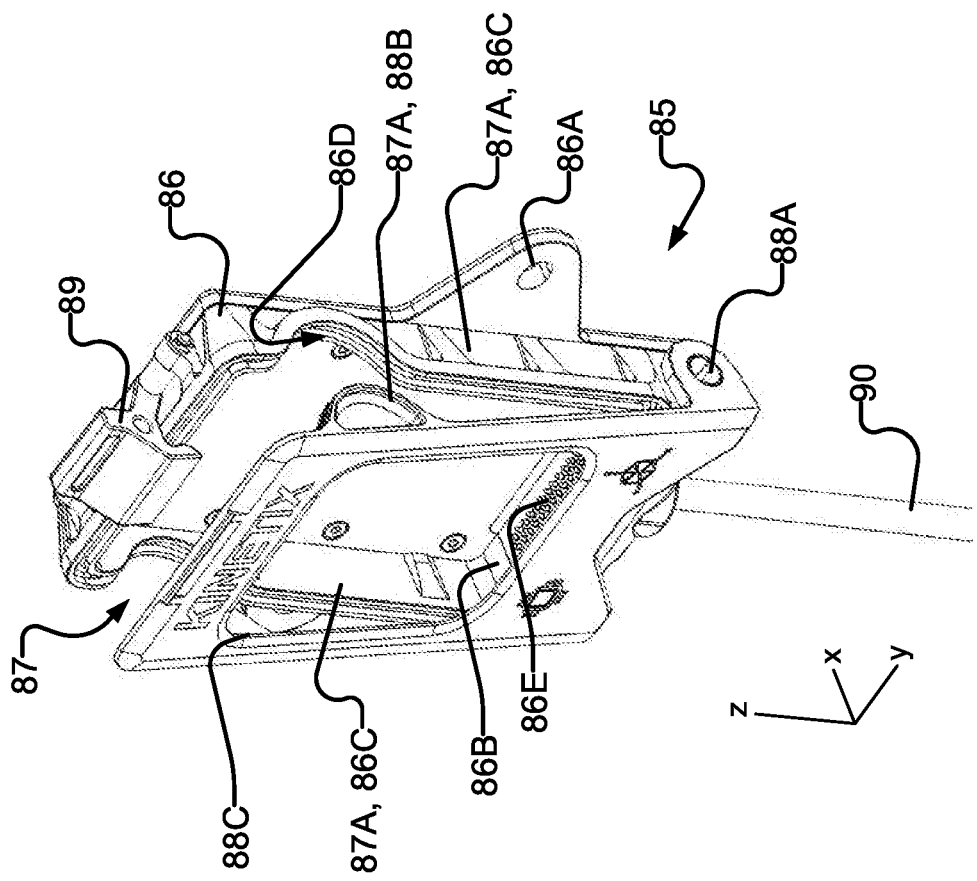
FIG. 7A is an isometric view of an exemplary central unit according to one example embodiment of the invention.
Figure 8:
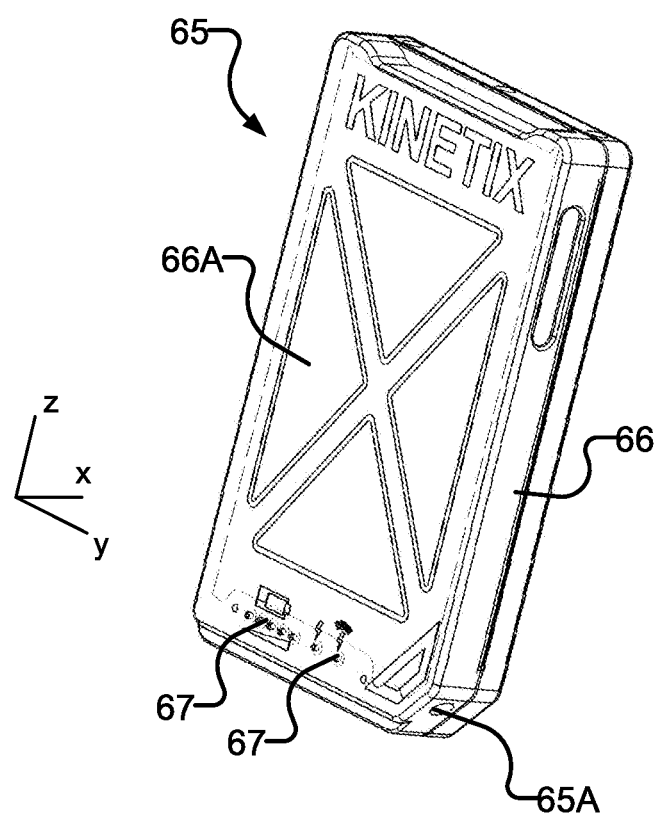
FIG. 8 is an isometric view of an exemplary storage device according to one example embodiment of the invention.

FIG. 7A depicts an example central unit 85 that houses controller 80 and second accelerometer unit 40. Central unit 85 also comprises a cradle 86 for non-permanently receiving a storage device 65 (depicted in FIG. 8). Storage device 65 may comprise one or both of data storage 60 and power source 70. In some embodiments, to reduce the number of removable parts of IPDL system 10 and to simplify charging and data storage, storage device 65 comprises both data storage 60 and power source 70.

Cradle 86 comprises one or more mounting features 86A for mounting cradle 86 in place as desired. In some embodiments, mounting features 86A comprise apertures for receiving suitable fasteners. In other embodiments, mounting features 86A may comprise adhesive or the like. In some embodiments, cradle 86 may be welded in place.

Cradle 86 comprises an enclosure 86B for housing controller 80 and/or second accelerometer unit 40. Enclosure 86B protects controller 80 and second accelerometer unit 40 from the elements whether a storage device bay 87 of cradle 86 is open or closed. In some embodiments, enclosure 86B may be filled with a potting material (such as, for example, silicone) to improve water-resistance, durability and shock-resistance of central unit 85.

A storage device bay 87 for receiving storage device 65 may be defined at least in part by cradle 86 and by a door 88. Door 88 may be pivotally mounted to cradle 86 by one or more pivots 88A. Door 88 may be pivotally movable between an open position and a closed position. In the open position, storage device 65 may be removed from or put into storage device bay 87. In the closed position, storage device 65 is securely held within storage device bay 87. One or more sensors may be provided to detect when door 88 is open or closed. Such sensors may be connected to controller 80 to allow controller 80 to shut down system 10 when door 88 is opened and before power source 70 is removed to prevent damage to system 10. A latch 89 may be provided to engage and releasably lock door 88 in the closed position, as desired.

Storage device bay 87 may be defined in part by sidewalls 87A. Sidewalls 87A may be made up of portions 86C of cradle 86 and tabs 88B of door 88. Recesses 86D defined by portions 86C of cradle 86 may be complementary in shape and size to tabs 88B of door 88 such that when door 88 is in the closed position, sidewalls 87 form a complete perimeter of storage device bay 87. Tabs 88B may be easy to grab with fingers to facilitate opening door 88. Recesses 86D may provide access to a portion of storage device 65 when door 88 is open to facilitate removal of storage device 65 from storage device bay 87. A sealant material (such as rubber, silicone, elastomer, etc.) may be provided around an edge of sidewalls 87A or on door 88A to form a waterproof or water-resistant seal between cradle 86 and door 88 when door 88 is in the closed position.

Storage device 65 may be asymmetrical about each of a YZ plane and an XY plane to ensure that storage device 65 may only be installed into storage device bay 87 in the correct orientation. For example, in the illustrated embodiment, one corner 65A of storage device 65 is different from the other corners of storage device 65 to ensure that storage device 65 may only be installed into storage device bay 87 in the correct orientation.

Cradle 86 may comprise a connector 86E for providing a data and/or power connection between storage device 65 and sensors 50. Connector 86E may comprise one or more connector pins. The connector pins may be spring loaded to reduce the likelihood of damage to the connector pins during installation of storage device 65. The spring loaded connector pins may also apply force to storage device 65 to hold storage device 65 in place when door 88 is open.

As shown in FIG. 7B, cradle 86 may comprise a ridge 86F or other features (not shown) protruding from portions 86C of cradle 86 that prevent storage device 65 from being installed into storage device bay 87 by moving storage device 65 directly in the Y direction to further reduce a likelihood of damage to connector 86E. Cradle 86 may comprise other features that guide storage device 65 into storage device bay 87.

Storage device 65 may comprise a casing 66 for housing data storage unit 60 and power source 70. In some embodiments, casing 66 may be filled with a potting material (such as, for example, silicone) to improve water-resistance, durability and shock-resistance of storage device 65. Casing 66 may comprise any suitable material such as metal (e.g. aluminum), composite or polymer.

Storage device 65 may comprise one or more indicators 67 (e.g. lights) to indicate battery level, charging status, etc. of power source 70.

In some embodiments, power source 70 is chargeable by solar power and casing 66 comprises an optional solar panel 66A. In some embodiments, power source 70 can be charged by solar panel 66A even when storage device 65 is installed in central unit 85 due to a window 88C provided in door 88 of central unit 85.

In some embodiments, power source 70 is chargeable by wireless charging (e.g. capacitive wireless charging and/or inductive wireless charging). In such embodiments, storage device 65 may comprise a wireless power receiver within casing 66. In some embodiments, it may be desirable for at least a portion of casing 66 to be non-metallic to reduce interference with wireless charging of power source 70 within casing 66.

In some embodiments, power source 70 is chargeable by wired charging and casing 66 includes a charging port for receiving a charging cable.

In some embodiments, it is desirable to reduce the number of cables (e.g. power or data transmission cables) that are visible or exposed in IPDL system 10 for safety, durability and/or ease of installation. In some embodiments, displacement unit 20 may house cable 90. Cable 90 may transmit power to, for example, first accelerometer unit 30 from power source 70. Cable 90 may transmit data from, for example, first accelerometer to data storage unit 60. In some embodiments, displacement unit 20 comprises one or more conductors (for transferring power or data) connected to cable 90.

Figure 4B:
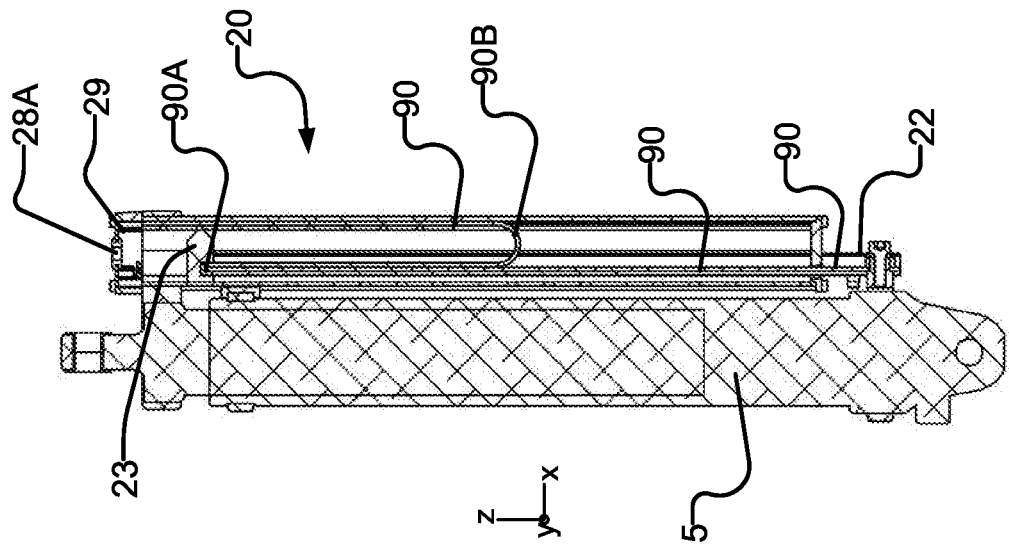
FIGS. 4A and 4B are cross-sectional views of the displacement unit and isolator of FIG. 2.
Figure 4A:
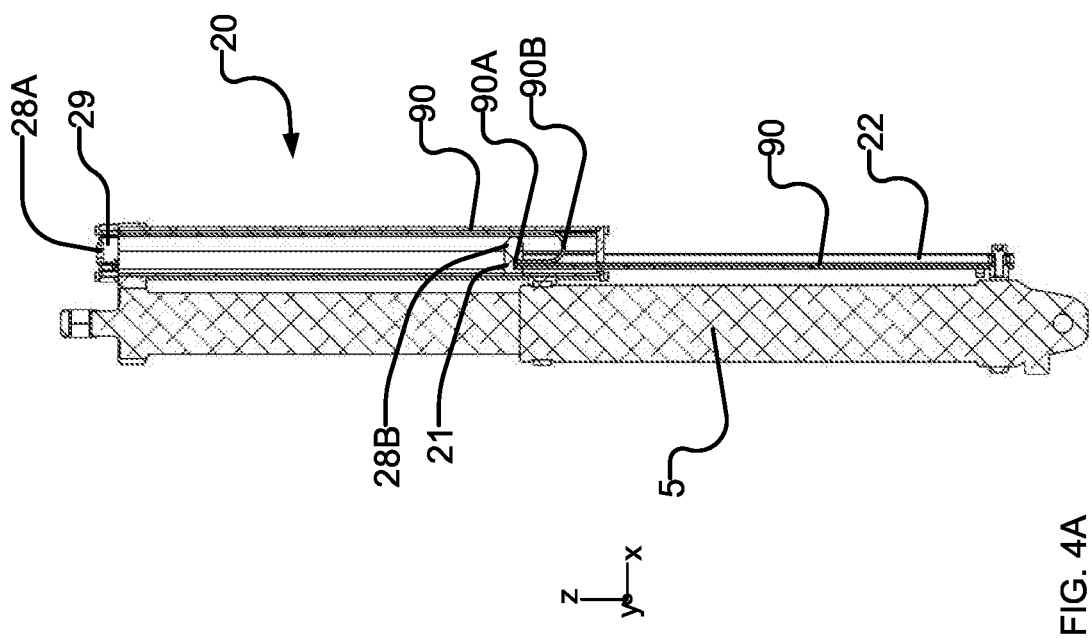

FIGS. 4A and 4B depict an exemplary embodiment of cable management for cable 90. In FIG. 4B, isolator 5 is in a relatively compressed configuration as compared to in FIG. 4A. Cable 90 runs from first accelerometer unit 30 to displacement unit 20. Cable 90 then runs along slot 22B of rail portion 22A of plunger 22 in the positive Z direction. Cable 90 may be covered within slot 22B or may uncovered within slot 22B. Where cable 90 reaches guide bushing 21, a suitable junction 90A may be provided to reverse the direction of cable 90 such that it points back toward unmitigated end 5C of isolator 5 (e.g. in the negative Z direction). Cable 90 may then be doubled over itself by a bend 90B to allow cable 90 to continue in the positive Z direction, past (or through) guide bushing 21 and toward displacement sensor 28A. In some embodiments, guide bushing 21 defines an aperture through which cable 90 may pass. In other embodiments, a space is defined between housing 24 and guide bushing 21 through which cable 90 may pass.

As guide bushing 21 moves in the Z direction relative to housing 24, the extent to which cable 90 doubles over itself increases or decreases as can be seen by comparing FIGS. 4A and 4B. Specifically, as isolator 5 compresses, the amount that cable 90 doubles over itself increases. As isolator 5 extends, the amount that cable 90 doubles over itself decreases. In this way, cable 90 does not interfere with plunger 22 and does not become damaged through undesirable bending or tangling of cable 90. A radius of bend 90B may be determined by properties of cable 90 itself. Advantageously, as isolator 5 compresses and extends, the radius of bend 90B is not required to change substantially, thereby reducing stress on cable 90. Bend 90B and doubling over of cable 90 provides a simple, inexpensive, low profile and durable way to house cable 90. In other embodiments, bend 90B could be replaced with a spring loaded coiling mechanism, a spiral coiled cable or another cable management mechanism.

Before cable 90 exits housing 24, it may connect to displacement sensor 28A. Cable 90 may then connect to central unit 85 to transfer data from first accelerometer unit 30 and displacement sensor 28A to controller 80 and data storage unit 60. Cable may also carry power from power source 70 to first accelerometer unit 30 and displacement sensor 28A. By employing a single cable 90 to power and communicate with sensors 50, it is possible to reduce the complexity of IPDL system 10, facilitate installation and transfer of IPDL system 10 and improve the safety of IPDL system 10.

FIGS. 9A and 9B depict an exemplary IPDL system 10 for displaying, determining, using and/or logging performance data of an isolator 5 of a suspension seat 6 that is mounted to a deck 7 of a vehicle. IPDL system 10 comprises displacement unit 20 mounted to isolator 5, first accelerometer unit 30 mounted to seat 6, and central unit 85 mounted to a back 6B of suspension seat 6. Storage device 65 may be inserted into central unit 85 to provide data storage and power to IPDL system 10. Central unit 85 is connected to displacement unit 20 and first accelerometer unit 30 by cable 90 which runs through displacement unit 20 to reduce the amount of exposed cable in IPDL system 10.

While first accelerometer unit 30 is depicted as being mounted to base 6A of seat 6, it could alternatively be mounted to deck 7. Similarly, while central unit is depicted as being mounted to back 6B of seat 6, it could also be mounted to any part of portion 6C of seat 6 (e.g. any portion of seat 6 that experiences forces that are mitigated by isolator 5).

In some embodiments, IPDL system 10 may comprise one or more additional sensors connected to controller 80. For example, IPDL system 10 may comprise a temperature sensor, a humidity sensor, a jerk sensor (also referred to as a jerkmeter) for measuring the rate of change of acceleration of, for example, a first portion of a suspension seat or a second portion of a suspension seat, or other sensors for detecting other characteristics as desired.

In some embodiments, IPDL system 10 may comprise one or more accelerometers or jerkmeters attachable to an occupant's head or neck to measure for head impacts. In some embodiments, IPDL system 10 may comprise one or more accelerometers or jerkmeters attachable to an occupant's back (e.g. lower back) to measure for back impacts. Data could be fed from such sensors through a small wire to controller 80 or through a wireless signal. The wireless version could be battery powered.

In some embodiments, IPDL system 10 may communicate with a mobile device (e.g. a smart phone, tablet, smart watch, smart glasses, a heart rate monitor, or the like) of a passenger to provide additional data. For example, the mobile device may comprise a heart rate sensor, an accelerometer, a global positioning sensor, an altimeter, a barometer, etc. and the mobile device may transmit heart rate data, accelerometer data, GPS data, altimeter data, barometer data, etc. to IPDL system 10. In some embodiments, one or more mobile devices communicate with IPDL system 10 through a wireless signal.

In some embodiments, a passenger may be able to employ a mobile device to log in to IPDL system 10. For example, the passenger may be able to pair their mobile device with IPDL system 10 or a sensor of IPDL system 10. IPDL system 10 may be able to track metrics (e.g. health, hours of travel, distance travelled, impacts, other metrics discussed herein, etc.) of a specific passenger over the course of one or more trips, in one or more seats and/or in one or more vessels. In some embodiments, each passenger has a profile (e.g. stored in central database 64) with such metrics, and other pertinent info (e.g. weight, height, age, etc.). In some embodiments, when a passenger logs in to a specific seat 6 of IPDL system 10, one or more characteristics of that seat may automatically be adjusted based on the passenger profile and/or the passenger may be provided with an alert (e.g. audio, visual or haptic) to change such characteristics of the seat. Such characteristics may include, seat height and/or isolator settings such as rebound damping, compression damping, preload, air pressure etc.

In some embodiments, a passenger may be able to employ a mobile device to send and/or receive messages to/from IPDL system 10 and/or to/from another person (e.g. passenger, driver, etc.) through IPDL system 10. For example, a passenger may be able to indicate that they have been injured by entering a command into a mobile device, pairing their mobile device with IPDL system 10 and/or by swiping their mobile device past a sensor, an RFID chip, NFC chip or the like. This communication may be provided to other passengers or the driver of vehicle 8 or to a command center. This communication may be stored in storage device 65 for subsequent use.

In some embodiments, IPDL system 10 is connected to a display. For example, in some embodiments, IPDL system 10 may be installed on a vehicle 8 and may be connected to a display screen that is native to vehicle 8. In some embodiments, IPDL system 10 communicates with a display screen or other hardware of a vehicle 8 by the NMEA 2000 communications standard. Alternatively, IPDL system 10 may be connected to a computer (e.g. a laptop) or mobile device (e.g. a smartphone, a tablet, a smart watch, smart glasses or any other wearable device) by a wireless or wired connection.

Figure 10:
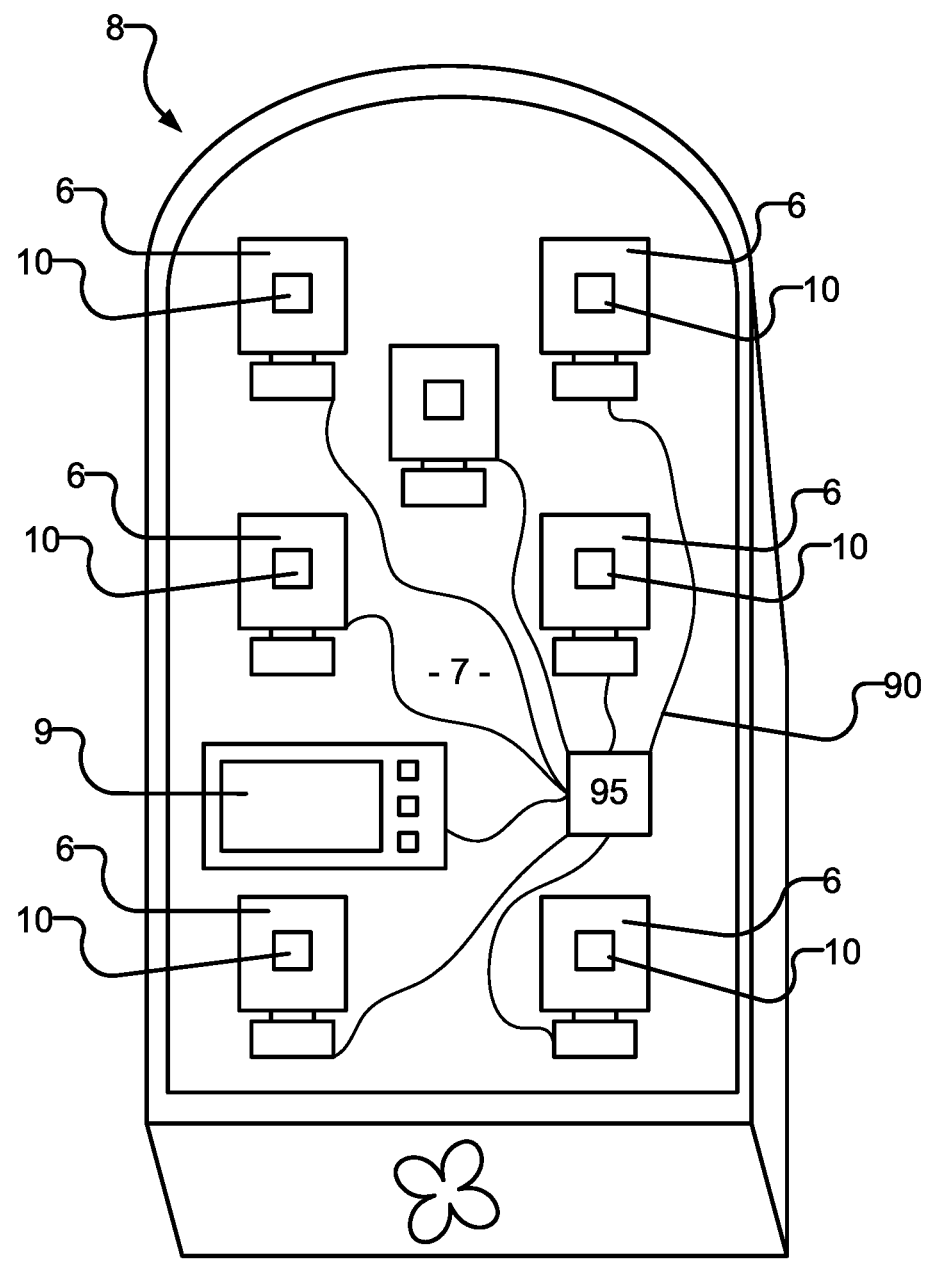
FIG. 10 is a schematic drawing of an exemplary vehicle and system(s) for displaying, determining, using and/or logging performance data of a suspension seat in the vehicle according to one example embodiment of the invention.

FIG. 10 is a schematic depiction of a vehicle 8 (e.g. a boat) having a plurality of suspension seats 6. Each suspension seat 6 of vehicle 8 has a corresponding IPDL system 10. This is not mandatory. In some embodiments, only some seats 6 on a vehicle 8 have an IPDL system 10. Each IPDL system 10 is connected (either wired or wirelessly) to display 9. Display 9 may be a display that is native to vehicle 8 or may be a separate display such as a laptop or mobile device loaded with appropriate software.

In some embodiments, data from each IPDL system 10 may be distinguishable based on an identifier embedded in the data of each IPDL system 10. In some embodiments, the data of each IPDL system 10 may be transmitted at a different frequency to facilitate distinguishing between each system. In some embodiments, each IPDL system 10 has its own cable 90 that provides data to display 9 (e.g. via a central hub 95) via a separate port and data is distinguished based on which port it was delivered to. In some embodiments, each controller 80 has a unique ID number which it sends along with the sensor data (e.g. to central hub 95 or at the time of data transfer from storage device 65). In some embodiments, display 9 is configured to associate seat ID with seats 6 on deck 7 and their respective locations on deck 7.

In some embodiments, data from each IPDL system 10 includes a passenger identifier. In some embodiments, the passenger identifies themselves by logging into IPDL system 10. In some embodiments, a captain or other third party identifies the passenger for each IPDL system 10. In this way, IPDL system 10 may track metrics of a unique passenger over time (e.g. across multiple trips, across multiple vessels, etc.)

In some embodiments, one or more IPDL systems 10 of a vehicle 8 may share one or more components (e.g. first accelerometer units 20, power sources 70 and/or data storage units 60 may be shared). This is not mandatory. In some embodiments, it is preferable that IPDL systems 10 of a vehicle 8 are separate and independent as each seat 6 may experience different forces and accelerations.

Display 9 may display (e.g. in real-time) data collected by sensors 50. For example, display 9 may display:
the magnitude of forces and/or accelerations experienced by passengers in seats 6 as measured by second accelerometer units 40;
a warning if the magnitude of forces and/or accelerations experienced by any passenger in a seat 6 is greater than a threshold magnitude;
the magnitude of forces and/or accelerations experienced by seats 6 or vehicle 8 as measured by first accelerometer units 30;
a warning if the magnitude of forces and/or accelerations experienced by seats 6 or vehicle 8 is greater than a threshold magnitude;
the displacement of the isolators 5 of each suspension seat as measured by displacement units 20;
a warning if any isolator 5 "bottoms out" (e.g. reaches the end of its travel) or is at risk of bottoming out as determined by monitoring the output of displacement unit 20 to determine if the displacement measured by displacement unit 20 exceeds a threshold corresponding to the maximum travel of isolator 5;
measures of accumulated shock and impact exposure to the passengers in seats 6 such as vibration dose value ("VDV") and equivalent compressive stress ("SED") metrics determined based on the output of sensors 50; and/or
measures of comfort and/or pain of passengers determined based on feedback from passengers and/or based on the output of sensors 50.

Such data may be presented in charts, graphs, status colours (e.g. red, yellow, green), or the like. Such data may be processed to improve user readability using suitable signal processing techniques (e.g. a Butterworth filter, or the like). A user may be provided with an alert or notification (e.g. via a computer or mobile device) if any of such data has a value that is greater or less than a threshold. The alert or notification may include visual, audio and/or haptic feedback. An operator of vessel 8 may choose to adjust speed, route, length of trip, a configuration of one or more isolators, etc. in response to the data displayed on display 9. Such adjustments may increase passenger safety, vehicle efficiency, passenger comfort, etc. Such adjustments may reduce damage to vehicle 8, injury to passengers, etc.

In some embodiments, isolator 5 may be adjusted manually or automatically on-the-fly in response to the output of sensors 50. For example, if it is clear that a user is too heavy for the current tuning of an isolator and is likely to bottom out the isolator undesirably, an air pressure or preload of the isolator may be increased either manually (e.g. with a hand pump) or automatically, with an automated pump connected to the isolator and controlled by IPDL system 10, vehicle 8, display 9 or otherwise. Similar adjustments could be made to rebound rate and compression rate tuning of isolators 5 as desired.

For example, IPDL system 10 may be connected to a controller of isolator 5 to:
open a valve to an external reservoir of isolator 5 to increase the fluid capacity of isolator 5 in mild operating conditions as determined by IPDL system 10;
close a valve to an external reservoir of isolator 5 to decrease the fluid capacity of isolator 5 in severe operating conditions as determined by IPDL system 10;
adjust damping settings (e.g. compression damping) of isolator 5 to increase a "stiffness" of isolator 5 in severe operating conditions as determined by IPDL system 10;
adjust damping settings (e.g. compression damping) of isolator 5 to decrease a "stiffness" of isolator 5 in mild operating conditions as determined by IPDL system 10;
adjust damping settings (e.g. decrease rebound damping) of isolator 5 when a speed of vehicle 8 increases as determined by IPDL system 10;
adjust damping settings (e.g. increase rebound damping) of isolator 5 when a speed of vehicle 8 decreases as determined by IPDL system 10;

adjust damping settings (e.g. compression damping) of isolator 5 to increase a "stiffness" of isolator 5 when isolator 5 is near its maximum displacement, as measured by IPDL system 10, to prevent bottom out of isolator 5;

adjust damping settings (e.g. compression damping) of isolator 5 to decrease a "stiffness" of isolator 5 when isolator 5 is far from its maximum displacement, as measured by IPDL system 10, to increase the sensitivity of isolator 5;

increase an air pressure inside isolator 5 when a speed of vehicle 8 increases as determined by IPDL system 10, when isolator 5 is near its maximum displacement, as measured by IPDL system 10, and/or in severe operating conditions as determined by IPDL system 10;

decrease an air pressure inside isolator 5 when a speed of vehicle 8 decreases as determined by IPDL system 10, when isolator 5 is far from its maximum displacement, as measured by IPDL system 10, 5, and/or in mild operating conditions as determined by IPDL system 10; and/or adjust damping settings, air pressure, reservoir valve position or any setting of isolator 5 based on previous data of a route provided by IPDL system 10, based on weather input from IPDL system 10, based on passenger weight as provided by IPDL system 10, or based on any other data from IPDL system 10;

etc.

As shown in FIGS. 1 and 10, in some embodiments, an optional central hub 95 is provided to receive data collected by sensors 50 of multiple IPDL systems 10 on a vehicle 8. In this way, when it is desired to transfer the data collected off of vehicle 8, only a single transfer is needed as opposed to individual transfers for each IPDL system 10. Central hub 95 may replace individual data storage units 60 or may be provided in addition to data storage units 60. Central hub 95 may be connected to each IPDL system either wirelessly or via wired connection. Central hub 95 may optionally also provide power to each IPDL system 10. Central hub 95 may replace individual power sources 70 or may be provided in addition to power sources 70.

In addition to or in the alternative to real-time use of data collected by IPDL system(s) 10, data collected by IPDL system(s) 10 may be stored and analyzed post collection. In some embodiments, data 62 is transferred from individual data storage units 60 to a central database 64 either wirelessly or by wired connection. In some embodiments, data 62 is transferred from central hub 95 to a central database 64 either wirelessly or by wired connection. Central database 64 may be hosted on a local server or on a remote server (e.g. in the cloud) that is accessible to access or download data 62 via the internet using custom software or via an internet browser-based application. In some embodiments, data 62 is encrypted at some or all stages of transfer between IPDL system(s) 10 and an end user.

Using suitable software, data 62 may be analyzed and used to do any, none or all of:

optimize the performance of isolators from which data 62 was gathered (e.g. by fine tuning their settings such as compression damping, rebound damping, air pressure, spring constant, preload, etc.);

log impacts experienced by a particular vehicle 8 or particular individual;

evaluate bottom-out risk;

monitor driving behaviour of various operators;

diagnose mechanical issues of isolators 5, suspension seats 6 and/or vehicles 8;

gather long-term data sets for identifying trends;

determine optimal routes by matching acquired GPS data to data 62;

determine accumulated shock and impact exposure to the passengers in seats 6 such as vibration dose value ("VDV") and equivalent compressive stress ("SED") based at least in part on measurements by first and second accelerometer units 30, 40 and associated temporal data;

determine seat performance metrics shock reduction using the Shock Response Spectrum ("SRS") based at least in part on measurements by first and second accelerometer units 30, 40 and associated temporal data;

estimate remaining lifetime of isolators 5, seats 6 and their components, and/or vehicles 8 and their components;

generate reports for maintenance crews;

flag maintenance issues and part failures to maintenance crews;

identify performance degradation;

evaluate operator skill during training missions;

rate an operator's ability to minimize vehicle impacts;

compare multiple operators' skills;

compare multiple route options;

develop custom training programs;

provide a digital logbook that may serve to augment or replace traditional coxswain logbooks by recording missions, time-at-sea, water conditions, etc.;

facilitate diagnosing impact-related injuries sustained on a vehicle 8;

facilitate insurance proceedings;

create animated replays of a mission showing impacts, vehicle motions (roll, pitch and yaw), seat displacement and acceleration, vehicle location on a map, etc.;

etc.

In some embodiments, IPDL system 10 comprises a position sensor such as but not limited to a GPS sensor or a similar sensor that uses GLONASS, GALLILEO or the like. In some embodiments, IPDL system 10 may be configured to communicate with a position sensor of a vehicle 8 (either wirelessly or by wired connection) or a mobile device.

During the installation process of first and second accelerometers 30, 40 and/or during use of IPDL system 10, the orientation or alignment of first accelerometer 30 and/or second accelerometer 40 may be changed (e.g. through adjustment of a recline angle of a suspension seat). Accordingly, a Z direction axis signal of the accelerometer may not align with the gravity vector. This misalignment may be remedied by a suitable calibration process. In some embodiments, for marine vehicles, the calibration process is undertaken at the dock or at another place where vehicle 8 is relatively stationary (e.g. on still water). In other embodiments, the calibration process may be undertaken when vehicle 8 is parked.

For example, in some embodiments, it may be possible to resolve the gravity vector when the accelerometer is stationary as the accelerometer will only be experiencing force applied by gravity (e.g. all other forces should be negligible as compared to the force of gravity). Once the gravity vector is resolved, a second direction can be determined by causing the accelerometer to experience an acceleration in a known direction (e.g. by driving the vehicle forward). Finally, the only remaining directional component will be the third direction (e.g. side to side).

One exemplary, non-limiting, algorithm for calibrating a tri-axial accelerometer is provided as follows. A time-dependent signal of a tri-axial accelerometer may be expressed as:

$$s(t)=(a_x(t),a_y(t),a_z(t))^T \quad (1)$$

where each component $a_x$, $a_y$, $a_z$ is the signal from a corresponding channel of the accelerometer and "$T$" denotes the transpose of the vector.

Using bold fonts, to denote vectors, the acceleration corresponding to Equation (1) may be expressed as:

$$a(t)=a_x(t)x+a_y(t)y+a_z(t)z \quad (2)$$

If $\hat{z}$ de notes the true z-direction, and similarly true $\hat{x}$ and $\hat{y}$ directions align with the forwards and portwards directions, respectively, then the right-handed coordinate system true acceleration vector is:

$$\hat{a}(t)=a_{\hat{x}}(t)\hat{x}+a_{\hat{y}}(t)\hat{y}+a_{\hat{z}}(t)\hat{z} \quad (3)$$

Equation 3 may also be expressed as a column vector $\hat{s}(t)=(a_{\hat{x}}, a_{\hat{y}}, a_{\hat{z}})^T$. Since the misalignment of the axis signals of the accelerometer is a problem of rotation, the accelerometer axis signals can be mapped to their true coordinates using the matrix vector product $$\begin{pmatrix} \hat{x} \\ \hat{y} \\ \hat{z} \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x \\ y \\ z \end{pmatrix} \quad (4)$$

where the matrix in Equation (4) is a rotation matrix denoted by R and the rows of R are denoted by $r_i$ and satisfy $\|r_i\|^2=1$ for i=1, 2, 3. Any vector in the misaligned axes can then be redefined in the true coordinates by means of Equation (4).

In the absence of any other forces, the accelerometer will read 1000 milli-g (where g=9.81 m/s$^2$) in the direction of gravity. By logging data from the accelerometer for a fixed time while the accelerometer is stationary, the third row of R, denoted by $r_3=p^T$ where $p=(r_{31}; r_{32}; r_{33})^T$ may be found since $p^T a(t)=1000$ and $\|p\|^2=1$.

If $s(t_i)$ is the acceleration at time step i, and a matrix with the measurements is $$X = \begin{pmatrix} a_x(t_1) & a_y(t_1) & a_z(t_1) \\ \vdots & & \\ a_x(t_n) & a_y(t_n) & a_z(t_n) \end{pmatrix} \quad (5)$$

and $b=1000\cdot(1, 1 \ldots, 1)^T$ is defined as the constant vector of length n, then $r_3$ may be found by solving for p in the following optimization problem:

| min | $\|Xp - b\|^2$ |
| subject to: | $\|p\|^2 = 1$ |

By introducing the Lagrange multiplier, $\lambda$, and setting the gradient to zero, the following identity may be derived:

$$\|p\|=\|(X^TX-\lambda I)^{-1}X^T b\| \quad (7)$$

The multiplier, $\lambda$, can be calculated by binary search, and from it p can be recovered and the rotation vector $r_3=p^T$ can be determined.

After finding $r_3$, accelerometer output can be mapped to the true z-direction. At any given time step, the true z acceleration is given by the vector $$a_{\hat{z}}(t_n)=r_3 s(t_n) \quad (8)$$

Having computed the true vertical component of acceleration, the true fore-aft component can be determined by conducting a calibration acceleration with the vessel. This requires a brief direct-forwards acceleration in the vessel while logging data. The rotation vector $r_1$ can then be determined by repeating the above procedure while constraining $r_1$ to be orthogonal to $r_3$ and setting b equal to the magnitude of the acceleration at each measurement in time.

Having determined $r_1$ and $r_3$, the rotation vector $r_2$ mapping measurements to the true port-starboard direction can be found by taking the vector cross-product $r_2=r_3 \times r_1$.

In some embodiments, controller 80 may be configured to undertake this calibration process. In some embodiments, hardware that is external to IPDL system 10 is provided to undertake this calibration process. In some embodiments, a processor aboard vehicle 8 may be configured to undertake this calibration process. In some embodiments, the measurements required for calibration are stored by controller 80 (e.g. in data storage 60) for post-processing of the non-calibrated data recorded by sensors 50 and stored in data storage 60. For example, such post-processing could occur at central hub 95, central database 64 or at a server that hosts central database 64. Such post-processing could occur after data 62 is downloaded or accessed from data storage 60, central hub 95, central database 64. Such post-processing could occur before displaying data 62 on display 9.

Figure 11:
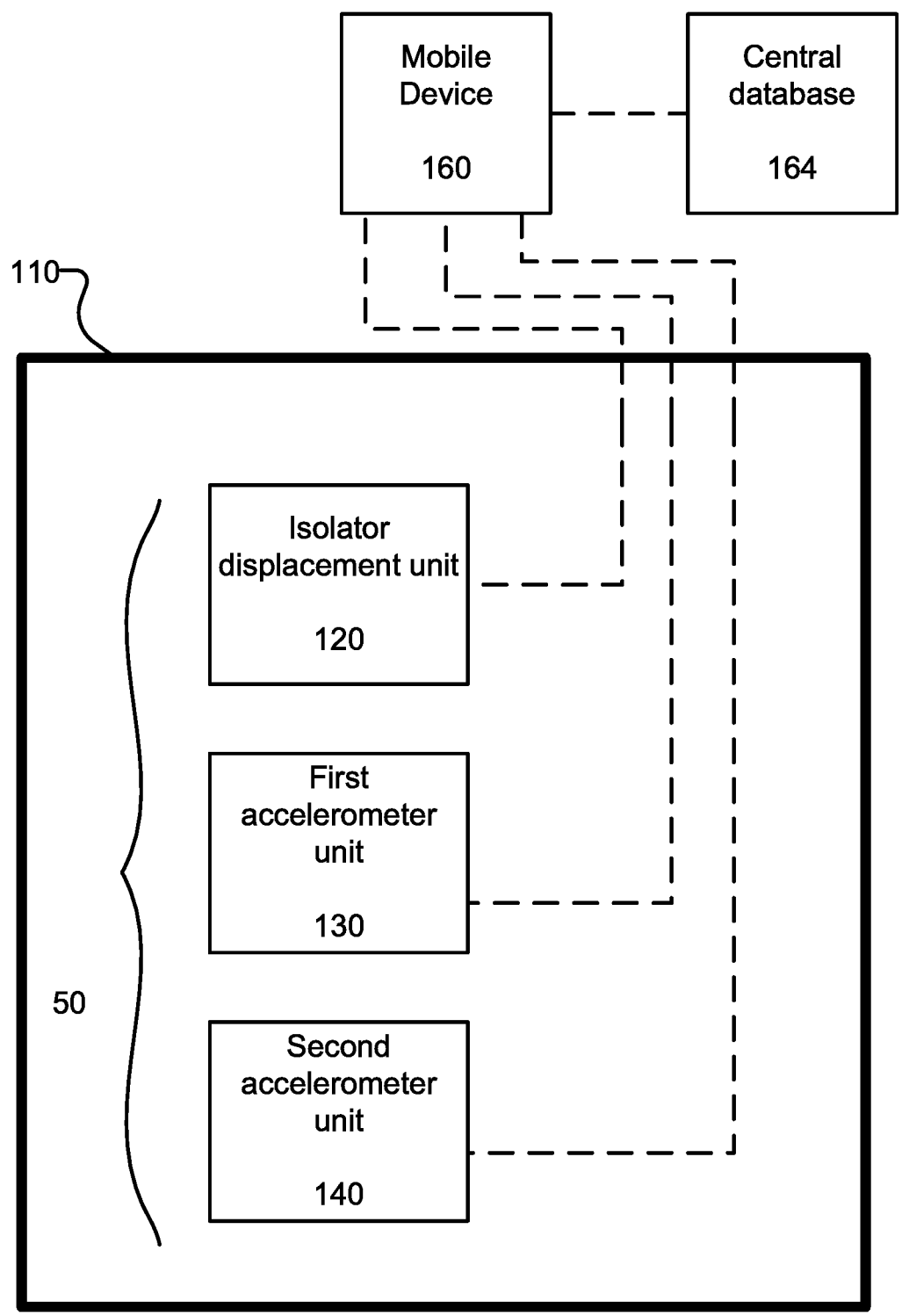
FIG. 11 is a schematic drawing of an exemplary system for displaying, determining, using and/or logging performance data of an isolator according to one example embodiment of the invention.

FIG. 11 is a schematic block diagram of another exemplary IPDL system 110 for displaying, determining, using and/or logging performance data of an isolator. IPDL system may be substantially similar to IPDL system 10, may obtain substantially similar data to IPDL system 10 and/or may be employed in a substantially similar manner as IPDL system 10 except as follows. IPDL system 110 comprises a displacement unit 120, a first accelerometer unit 130 and a second accelerometer unit 140 (collectively referred to as sensors 150). Each of sensors 150 may be connectable to a mobile device 160 for storing and/or displaying measurements obtained by sensors 150. For example, each of sensors 150 may be connectable to mobile device 160 via a wireless signal. Mobile device 160 may be connectable to a central database 164 substantially similar to central database 64.

Like displacement unit 20, displacement unit 120 may measure the displacement or travel of the isolator (e.g. the relative Z direction movement between an unmitigated end of the isolator and a mitigated end of the isolator) either directly or indirectly. Like first accelerometer unit 30, first accelerometer unit 130 may measure accelerations and determine or be used to determine forces and movements at an unmitigated end of the isolator. Like second accelerometer unit 40, second accelerometer unit 140 may measure accelerations and determine or be used to determine forces and movements at a mitigated end of the isolator.

In contrast to sensors 50, each sensor 150 may employ substantially similar hardware. For example, in some embodiments, each sensor 150 comprises a sensor unit 151. Each sensor unit 151 may have its own power source, and/or its own wireless communication capabilities for communicating with mobile device 160 (or, for example, a laptop).

Figure 12:
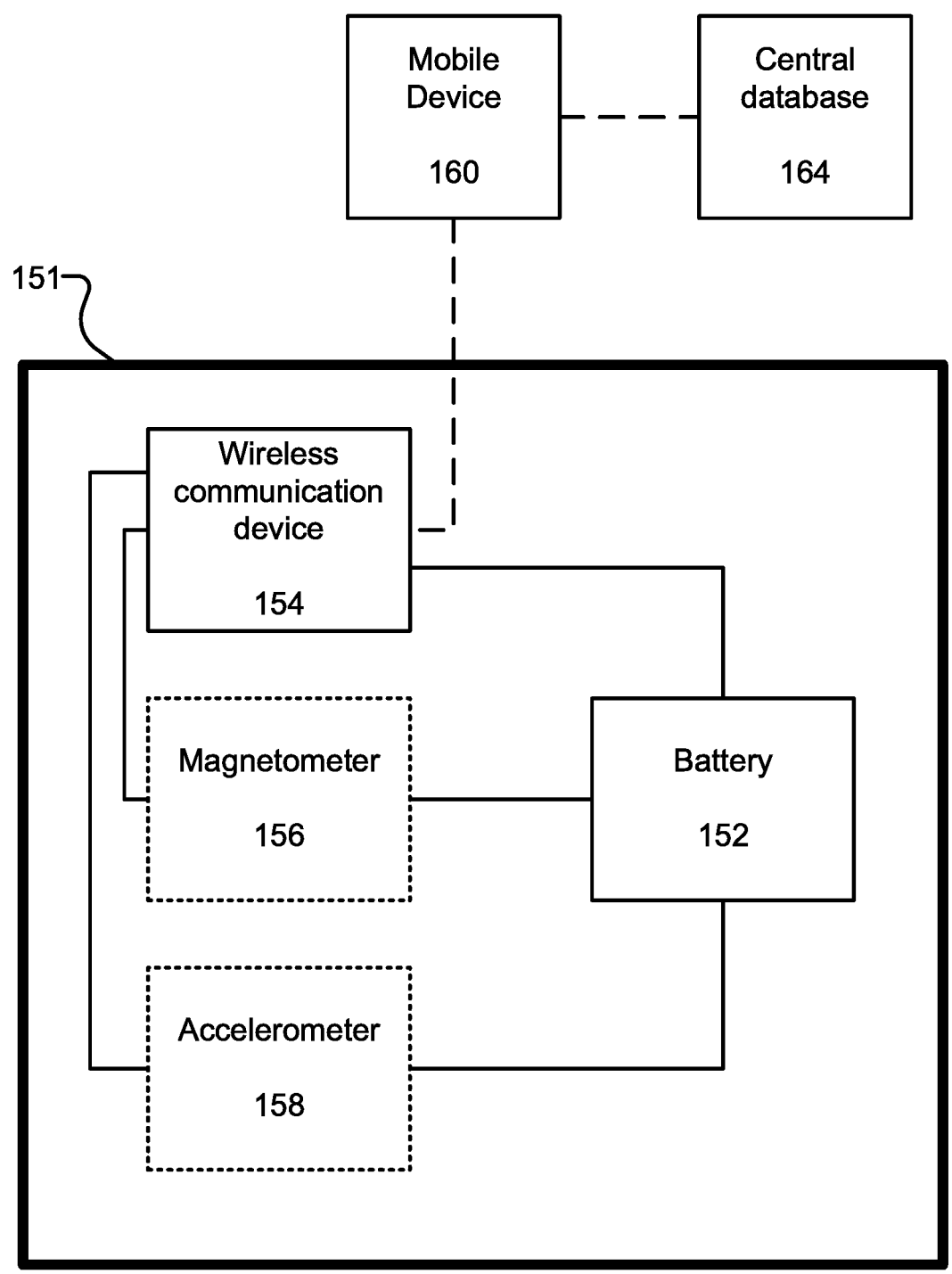
FIG. 12 is a schematic drawing of an exemplary sensor unit for logging performance data of an isolator according to one example embodiment of the invention.

FIG. 12 is a schematic diagram of a sensor unit 151. In some embodiments, sensor unit 151 comprises a battery 152, a wireless communication device 154, an optional magnetometer 156, and an optional accelerometer 158.

Battery 152 may comprise any suitable battery. For example, battery 152 may comprise a Nickel Cadmium battery, an alkaline battery, a Nickel-metal Hydride battery, a Lead Acid battery, a Lithium Ion battery, a Lithium Polymer battery, etc. In some embodiments, battery 152 is replaceable without damaging sensor unit 151. For example, battery 152 may comprise a button cell battery. Battery 152 may provide power to wireless communication device 154, optional magnetometer 156 and/or optional accelerometer 158. Battery 152 may be rechargeable. Battery 152 may be connected to a wireless charging circuit for wireless charging of battery 152.

Wireless communication device 154 may comprise any suitable wireless communication device. For example, wireless communication device 154 may allow for communication to and/or from magnetometer 156 and/or accelerometer 158 via Wi-fi, cellular data service, low-power wide-area networks, NFC, Bluetooth, Bluetooth low energy, active RFID, zigbee, z-wave, etc. In some embodiments, wireless communication device 154 incorporates or is connected to a data storage unit for storing (e.g. buffering) data from magnetometer 156 and/or accelerometer 158 as needed.

Sensor unit 151 may comprise, for example, a programmable processor. The controller may have a sampling rate of 500 Hz, 667 Hz, 1000 Hz or more. The controller may, for example, determine which signals and/or measurements of sensors 150 should be transferred by wireless communication device 154. The controller may condition, calibrate or convert signals from sensors 150 into suitable formats and values for subsequent or real-time use. The controller may comprise a clock for keeping track of the time at which measurements were taken by sensors 150 or at which time signals were received from sensor 150. In some embodiments, sensors 150 themselves include clocks for keeping track of the times at which measurements were taken and such data is sent to the controller. The controller may be connected to one or more lights (e.g. LEDs) or sound-emitters to warn a user when battery 152 capacity is below a threshold and/or when system 10 experiences an error. The controller may monitor and optimize power output from batter 152 to sensors 150. The controller may be configured to control a power output of battery 152 and/or power usage of sensor unit 151 depending on, for example, remaining battery capacity, available power, whether or not movement or acceleration is detected, etc. For example, the controller may cause sensor unit 151 to sleep if sensor unit 151 does not detect substantial change during a given period of time.

Magnetometer 156 may comprise any suitable magnetometer. Magnetometer 156 may comprise a vector magnetometer, an absolute magnetometer or a relative magnetometer. For example, magnetometer 156 may comprise a hall effect sensor, inductive pickup coils, a vibrating sample magnetometer, a pulsed field extraction magnetometer, a magnetic torque magnetometer, a faraday force magnetometer, an optical magnetometer, etc. In some embodiments, magnetometer 156 has a sampling rate in a range between 256 Hz to 1000 Hz. In some embodiments, magnetometer 156 provides a digital output that is provided wireless communication device 154. In some embodiments, magnetometer 156 provides an analog output and wireless communication device 154 or another suitable piece of hardware converts the analog output to a digital signal for wireless communication device 154.

Accelerometer 158 may comprise any suitable three axis accelerometer sensor (or a combination of one and/or two axis accelerometers), such as, for example, a DC response accelerometer, an AC response accelerometer, a piezoresistive accelerometer, a piezoelectric accelerometer, a capacitive MEMS accelerometer, etc. In some embodiments, accelerometer 158 has a sampling rate in a range between 256 Hz to 1000 Hz. In some embodiments, accelerometer 158 has a resolution in the range of 0.1 g to 0.0001 g (where g=9.81 m/s$^2$). In particular embodiments, accelerometer 158 has a resolution of about 0.001 g. In some embodiments, accelerometer 158 provides a digital output that is provided wireless communication device 154. In some embodiments, accelerometer 158 provides an analog output and wireless communication device 154 or another suitable piece of hardware converts the analog output to a digital signal for wireless communication device 154.

In some embodiments, sensor unit 151 may comprise an accelerometer 158 and no magnetometer 156. For example, where sensor unit 151 is employed as first accelerometer unit 130 or second accelerometer unit 140, magnetometer 156 may not be included. In some embodiments, sensor unit 151 may comprise a magnetometer 156 and no accelerometer 158. For example, where sensor unit 151 is employed isolator displacement unit 120, accelerometer 158 may not be included. In some embodiments, sensor unit 151 comprises both magnetometer 156 and accelerometer 158 regardless of its application.

Figure 13:
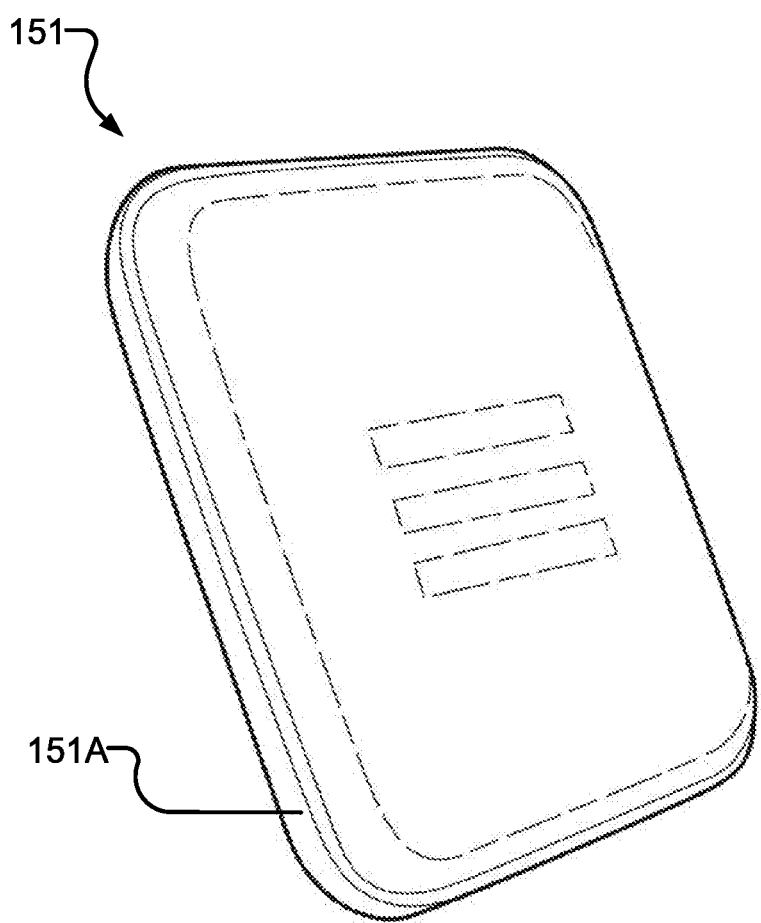
FIG. 13 is a front perspective view of an exemplary sensor unit for logging performance data of an isolator according to one example embodiment of the invention.

FIG. 13 depicts an exemplary sensor unit 151 according to an example embodiment of the invention. Sensor unit 151 may comprise a housing 151A for protecting its components (e.g. battery 152, wireless communication device 154, optional magnetometer 156, and optional accelerometer 158) from the elements. In some embodiments, housing 120A may be filled with a potting material (such as, for example, silicone) to improve water-resistance, durability and shock-resistance of sensor unit 151. In some embodiments, a vibration damping material may be provided on or inside housing 151A. In some embodiments, housing 151A is mounted to a bracket by fasteners. The bracket may comprise one or more mounting features for attaching sensor unit 151 as desired. In some embodiments, housing 151A itself may comprise one or more mounting features. In some embodiments, the mounting features comprise apertures for receiving suitable fasteners. In other embodiments, the mounting features may comprise adhesive, suction devices, clamps, or the like.

Figure 14:
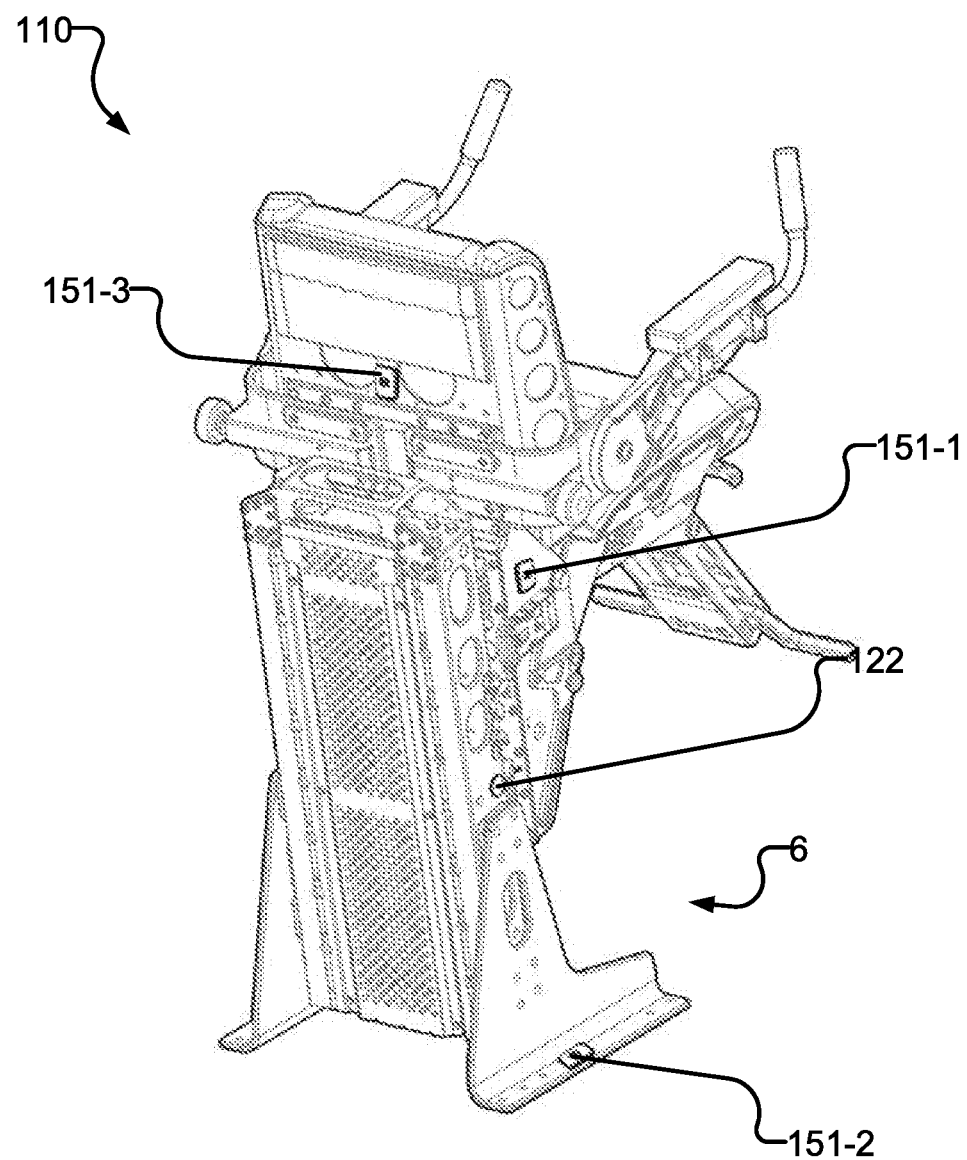
FIG. 14 is rear perspective view of an exemplary suspension seat and system for displaying, determining, using and/or logging performance data of the suspension seat according to one example embodiment of the invention.

FIG. 14 depicts an exemplary non-limiting embodiment of IPDL system 110 installed on a seat 6.

Isolator displacement unit 120 may employ a first sensor unit 151-1. In some embodiments, a first sensor unit 151-1 is attached to isolator 5 such that first sensor unit 151-1 is fixed relative to a first end of isolator 5 (e.g. unmitigated end 5C) and a magnet 122 is fixed relative to a second end of isolator 5 (e.g. mitigated end 5D). Magnet 122 may comprise any suitable magnet such as, but not limited to a permanent magnet or an electromagnet. Magnet 122 may have a protective cover or coating to protect it from corrosion and/or other damage.

As isolator 5 cycles through its travel, the distance between first sensor unit 151-1 and magnet 122 will change. As such, the magnitude of the magnetic field of magnet 122 experienced by magnetometer 156 of first sensor unit 151-1 will also change. Therefore, by tracking the magnitude of the magnetic field of magnet 122 experienced by magnetometer 156 of first sensor unit 151-1 over time, it is possible to determine the displacement of isolator 5 over time. In practice, the magnitude of the magnetic field of magnet 122 experienced by magnetometer 156 of first sensor unit 151-1 over time may be sent to mobile device 160 via wireless communication device 154 and the displacement of isolator 5 over time may be determined by, for example, mobile device 160 or central database 164.

First accelerometer unit 130 may employ a second sensor unit 151-2. Second sensor unit 151-2 may be attached to, for example, unmitigated end 5C of isolator 5 or another portion of a vehicle that is attached to unmitigated end 5C of isolator 5. In the case of a suspension seat, second sensor unit 151-2 could be mounted to the deck of a vehicle, or a portion of a pedestal or support of the seat. First accelerometer unit 130 may function in a substantially similar way to first accelerometer unit 30 except that data captured by first accelerometer unit 130 is sent directly to mobile device 160 via wireless communication device 154 of sensor unit 151-2.

Second accelerometer unit 140 employ a third sensor unit 151-3. Third sensor unit 151-3 may be attached to, for example, mitigated end 5D of isolator 5 or another mitigated portion of a vehicle that is attached to mitigated end 5D of isolator 5. In the case of a suspension seat, third sensor unit 151-3 could be mounted to the seat itself. In some embodiments, second accelerometer unit 140 is substantially similar to first accelerometer unit 130.

In some embodiments, third sensor unit 151-3 is unnecessary and accelerometer 158 of first sensor unit 151-1 could be employed as a second accelerometer unit 140.

Due to the relative simplicity of sensor units 151, sensor units 151 allow for an inexpensive implementation of IPDL system 110. Sensor units 151 allow for a flexible implementation of IPDL system 110 since sensor units 151 may be installed on various apparatus (e.g. vehicles, bicycles, seats, etc.) without modification and without custom fabrication. Sensor units 151 may be employed to provide additional data to that discussed herein without substantial changes. For example, sensor units 151 could be employed to measure transverse (e.g. X or Y direction) movement of a seat 6.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.
Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the present invention include various operations, which are described herein. These operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Where wireless signals are discussed herein, it should be understood that such wireless signals can be transmitted/received via any suitable protocol and/or using any suitable wireless signal transmitters/receivers. Exemplary, non-limiting, examples of such wireless protocols include Wi-fi, cellular data service, low-power wide-area networks, NFC, Bluetooth, Bluetooth low energy, active RFID, zigbee, z-wave, etc.

Computer processing components used in implementation of various embodiments of the invention include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In particular embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and systems have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

As will be apparent to those skilled in the art in light of the foregoing disclosure, many alterations and modifications are possible in the practice of this invention without departing from the spirit or scope thereof. For example:

- While unmitigated end 5C is depicted as being at an end of tube 5B and mitigated end 5D is depicted as being at an end of piston 5A, this is not mandatory. Instead, isolator 5 could be flipped such that unmitigated end 5C is at an end of piston 5A and mitigated end 5D is at an end of tube 5B.
- While plunger 122 is adjacent to tube 5B of isolator 5 and housing 124 is adjacent to piston 5A of isolator 5, this is not necessary and can be swapped such that plunger 122 is adjacent to piston 5A and housing 124 is adjacent to tube 5B.
- While the XY plane cross-section of rail portion 22A of plunger 22 is depicted as being H-shaped, it should be understood that any suitable cross-section (e.g. round, flat, square, triangular, I-shaped, L-shaped, U-shaped, V-shaped, etc.) could be employed.
- While IPDL systems are disclosed herein as each comprising a displacement unit 20, a first accelerometer unit 30 and a second accelerometer unit 40, this is not mandatory. In some embodiments, one or more of sensors 50 is not present or is replaced as desired.
- While door 88 is depicted as pivoting upwardly about an X direction axis, this is not mandatory. Door 88 could pivot about an X, Y or Z direction axis and could open upwardly, downwardly or to the right or left.
- While cable 90 is described and depicted as being a single cable, it should be understood that cable 90 may comprise a cable (e.g. a ribbon cable) having multiple cables (e.g. data transfer cables and/or power cables) all housed within a housing of cable 90.

To facilitate the description of IPDL system 10 and its interaction with isolator 5, various parts of isolator 5 may be described herein. Such description of isolator 5 is provided merely for convenience and is not meant to limit isolator 5 to have any particular characteristics or construction.

The invention claimed is:

1. An isolator performance data logging system, the system comprising:
   a first accelerometer unit fixable relative to a mitigated end of an isolator to measure mitigated accelerations;
   a second accelerometer unit fixable relative to an unmitigated end of the isolator to measure unmitigated accelerations;
   a displacement unit, the displacement unit comprising a displacement sensor fixable relative to the mitigated end of the isolator;
   a target fixable relative to the unmitigated end of the isolator, wherein the displacement sensor measures a displacement of the target relative to the displacement sensor for determining a displacement of the isolator.

2. The system according to claim 1 wherein the target comprises a plunger fixable relative to an unmitigated end of the isolator and at least partially slidably received within a displacement sensor housing of the displacement unit.

3. The system according to claim 2 wherein the displacement sensor housing is fixable to a first endcap of the isolator and the target is fixable to a second endcap of the isolator.

4. The system according to claim 2 comprising a cable connected to:
   deliver power to the displacement unit and transfer measurements from the displacement unit to a data storage device, wherein the cable is housed partially in the displacement sensor housing;
   deliver power to the first accelerometer unit and transfer measurements from the first accelerometer unit to the data storage device; and
   deliver power to the second accelerometer unit and transfer measurements from the second accelerometer unit to the data storage device.

5. The system according to claim 4 wherein the cable is at least partially doubled over itself on the first side of the guide bushing and within the displacement sensor housing such that as the guide bushing slides within the displacement sensor housing in a direction toward the displacement sensor, an amount of the cable that is doubled over increases and as the guide bushing slides within the displacement sensor housing in a direction away from the displacement sensor, the amount of the cable that is doubled over decreases.

6. The system according to claim 4 comprising a removable casing, wherein the removable casing contains the data storage device and a battery for powering the isolator performance data logging system and the removable casing is non-permanently removable from a storage bay of the system.

7. The system according to claim 1 wherein the target comprises a magnet and the displacement sensor comprises a magnetometer.

8. The system according to claim 7 wherein the displacement unit comprises:
   a first wireless communication device for transmitting measurements from the displacement unit; and
   a first battery to power the displacement unit.

9. The system according to claim 8 wherein:
   the first accelerometer unit comprises:

a second wireless communication device for transmitting the measurements from the first accelerometer unit; and a second battery to power the first accelerometer unit; and the second accelerometer unit comprises:

a third wireless communication device, for transmitting the measurements from the second accelerometer unit; and a third battery to power the second accelerometer unit.

10. The system according to claim 1 wherein the isolator is part of a suspension seat, the first accelerometer unit is attached to a mitigated portion of the seat and the second accelerometer is attached to an unmitigated portion of the seat.

11. The system according to claim 1 wherein the isolator is part of a suspension seat on a vehicle, the first accelerometer unit is attached to a mitigated portion of the seat and the second accelerometer is attached to a deck of the vehicle.

12. A method of logging isolator performance data, the method comprising:

measuring, in real-time, a displacement of the isolator;

measuring, in real time, mitigated accelerations of a mitigated end of the isolator;

measuring, in real time, unmitigated accelerations of an unmitigated end of the isolator; and displaying, in real time, one or more indicators based at least in part on one or more of the displacement measurements, the mitigated accelerations measurements and the unmitigated accelerations measurements.

13. A method according to claim 12 wherein measuring, in real-time, the displacement of the isolator comprises employing a magnetometer fixed to the mitigated end of the isolator to measure the magnetic field of a magnet fixed to the unmitigated end of the isolator.

14. A method according to claim 12 comprising obtaining one or more real time measurements from a mobile device and wherein the one or more indicators is based at least in part on the one or more real time measurements from the mobile device and the one or more of the displacement measurements, the mitigated accelerations measurements and the unmitigated accelerations measurements.

15. A method according to claim 12 comprising adjusting one or more settings of the isolator, in real time, based at least in part on one or more of the displacement measurements, the mitigated accelerations measurements and the unmitigated accelerations measurements.

16. A method according to claim 15 wherein the one or more settings of the isolator is selected from the group consisting of a compression damping setting, an air pressure setting, a rebound damping setting and a stroke length setting.

17. A method according to claim 12 comprising adjusting one or more settings of a seat attached to the isolator, in real time, based at least in part on one or more of the displacement measurements, the mitigated accelerations measurements and the unmitigated accelerations measurements, wherein the one or more settings of the seat comprises a height of the seat.

18. A method according to claim 12 comprising attributing the one or more indicators to a specific passenger and tracking the one or more indicators attributed to the specific passenger over time.

19. A method according to claim 18 comprising receiving an indication from the specific passenger of their identity, the indication comprising pairing a mobile device of the specific passenger to a sensor.

20. An isolator performance data logging system, the system comprising:

a first sensor unit, a second sensor unit and a third sensor unit, wherein each of the first, second and third sensor units comprises a sensor unit housing containing:

a wireless communication device;

a battery;

a magnetometer; and an accelerometer;

wherein the first sensor unit is fixed relative to a mitigated end of the isolator and the magnetometer of the first sensor unit measures displacement of a magnet fixed to an unmitigated end of the isolator;

wherein the second sensor unit is fixed relative to the mitigated end of the isolator and measures accelerations of the mitigated end of the isolator; and wherein the third sensor unit is fixed relative to the unmitigated end of the isolator and measures accelerations of the unmitigated end of the isolator.

* * * * *